(12) United States Patent
Victor et al.

(10) Patent No.: US 12,664,130 B2
(45) Date of Patent: *Jun. 23, 2026

(54) SEPARATION OF STORAGE AND COMPUTE IN DATABASE MANAGEMENT SYSTEMS

(71) Applicant: Singlestore, Inc., San Francisco, CA (US)

(72) Inventors: Joseph Victor, Oakland, CA (US); Adam Prout, Mississauga (CA); Rodrigo Toste Gomes, San Francisco, CA (US); Kai Yuan Lung, San Francisco, CA (US)

(73) Assignee: SingleStore, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/821,538

(22) Filed: Aug. 30, 2024

(65) Prior Publication Data

US 2025/0061093 A1 Feb. 20, 2025

Related U.S. Application Data

(63) Continuation of application No. 17/559,491, filed on Dec. 22, 2021, now Pat. No. 12,079,172.

(51) Int. Cl.
*G06F 16/178* (2019.01)

(52) U.S. Cl.
CPC .................................. *G06F 16/178* (2019.01)

(58) Field of Classification Search
CPC ...................................................... G06F 16/178

USPC .......................................................... 707/613
See application file for complete search history.

(56) References Cited

U.S. PATENT DOCUMENTS

| | | | |
|---|---|---|---|
| 7,536,435 B2 | 5/2009 | Campbell et al. | |
| 7,668,846 B1 | 2/2010 | Ghemawat et al. | |
| 7,720,801 B2 | 5/2010 | Chen | |
| 8,789,208 B1 | 7/2014 | Sundaram et al. | |
| 8,849,759 B2 * | 9/2014 | Bestler ................ | G06F 16/1824 |
| | | | 707/638 |
| 10,452,680 B1 | 10/2019 | Fan et al. | |

(Continued)

OTHER PUBLICATIONS

Victor, Joseph: "The Future is Bottomless", Apr. 22, 2020; SingleStore Inc. https://www.singlestore.com/blog/the-future-is-bottomless/.

(Continued)

*Primary Examiner* — Cam Linh T Nguyen
(74) *Attorney, Agent, or Firm* — EIP US LLP

(57) ABSTRACT

Disclosed herein is a method of managing data in a database management system comprising a first, master storage, node and a second node for performing operations on data stored in the database. The method comprises configuring the second node to perform a set of steps. The second node is configured to write data indicative of one or more operations on data to a set of log files. The second node segments the set of log files into a set of log file chunks For each of the log file chunks, the second node may transmit data from the database associated with a log file chunk to the first node and thereafter transmit the log file chunk to the first node. The segmenting and transmitting of the set of log files and their associated data may be performed asynchronously to the updating of the set of log files.

20 Claims, 14 Drawing Sheets

(56)                References Cited

U.S. PATENT DOCUMENTS

| | | | |
|---|---|---|---|
| 10,567,500 | B1 | 2/2020 | Leshinsky et al. |
| 10,803,012 | B1 | 10/2020 | Madhavarapu et al. |
| 11,262,918 | B1 | 3/2022 | Venugopal et al. |
| 2008/0228834 | A1 | 9/2008 | Burchall et al. |
| 2010/0306488 | A1 | 12/2010 | Stroberger |
| 2011/0196822 | A1* | 8/2011 | Zunger .................. G06F 16/27 |
| | | | 707/E17.044 |
| 2011/0196900 | A1* | 8/2011 | Drobychev .......... G06F 16/122 |
| | | | 707/812 |
| 2013/0290268 | A1 | 10/2013 | Schreter |
| 2015/0347553 | A1 | 12/2015 | Aizman et al. |
| 2016/0248803 | A1 | 8/2016 | O'Connell et al. |
| 2017/0277709 | A1 | 9/2017 | Strauss et al. |
| 2017/0279720 | A1 | 9/2017 | Patnaik et al. |
| 2018/0084086 | A1 | 3/2018 | Newman et al. |
| 2018/0217910 | A1 | 8/2018 | Yang et al. |
| 2019/0266277 | A1 | 8/2019 | Lautenschlaeger et al. |
| 2020/0192899 | A1 | 6/2020 | Joshi et al. |
| 2020/0293412 | A1 | 9/2020 | Liang et al. |
| 2020/0327097 | A1 | 10/2020 | Birka et al. |

OTHER PUBLICATIONS

Armbrust et al; "Delta Lake: High-Performance Acid Table Storage over Cloud Object Stores"; delta-paper-authors@databricks.com.
Vuppalapati et al; "Building an Elastic Query Engine on Disaggregated Storage" Proceedings of the 17th USENIX Symposium on Networked Systems Design and Implementation (NSDI '20) Feb. 25-27, 2020, Santa Clara, CA, USA https://www.usenix.org/conference/nsdi20/presentation/vuppalapati.
Dageville, Benoit et al; "The Snowflake Elastic Data Warehouse"; Snowflake Computing, Jun. 26-Jul. 1, 2016, San Francisco, USA.
Key Concepts & Architecture—Snowflake Documentation; https://docs.snowflake.com/en/user-guide/intro-key-concepts.html#snowflake-architecture.

* cited by examiner

Record of metadata of segment 402

Snapshot at LSN_X

324i

318

320A
LSNi

320B
LSNii

320C
LSNiii

320D
LSNiv

320E
LSNv

320F
LSNvi

Time

326

402

File Name Includes:

LSNiii $C_1$   $C_2$   $C_3$   $C_4$ 1 million rows

Columnstore File

500

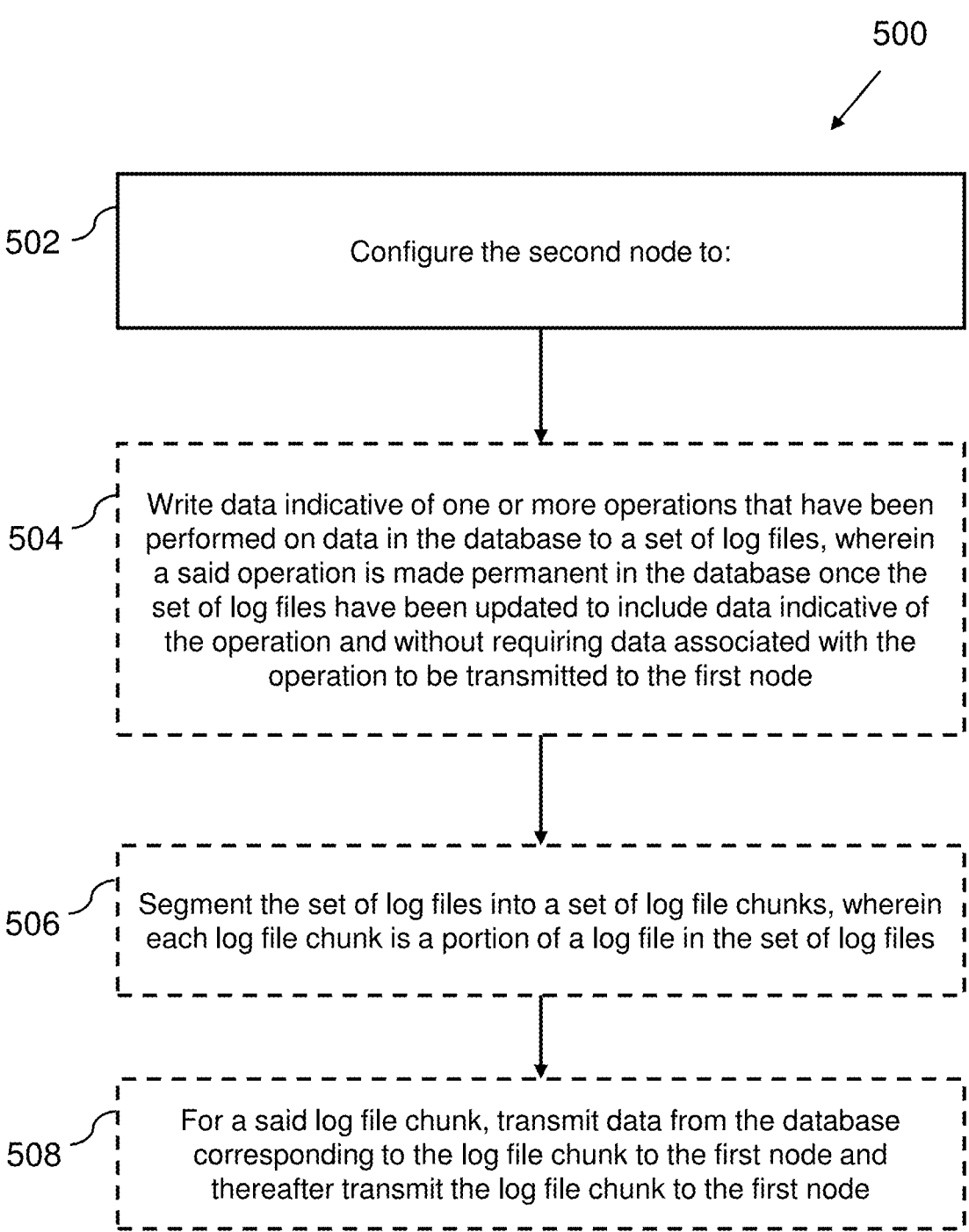

502 — Configure the second node to:

504 — Write data indicative of one or more operations that have been performed on data in the database to a set of log files, wherein a said operation is made permanent in the database once the set of log files have been updated to include data indicative of the operation and without requiring data associated with the operation to be transmitted to the first node 506 — Segment the set of log files into a set of log file chunks, wherein each log file chunk is a portion of a log file in the set of log files 508 — For a said log file chunk, transmit data from the database corresponding to the log file chunk to the first node and thereafter transmit the log file chunk to the first node

*FIG. 5*

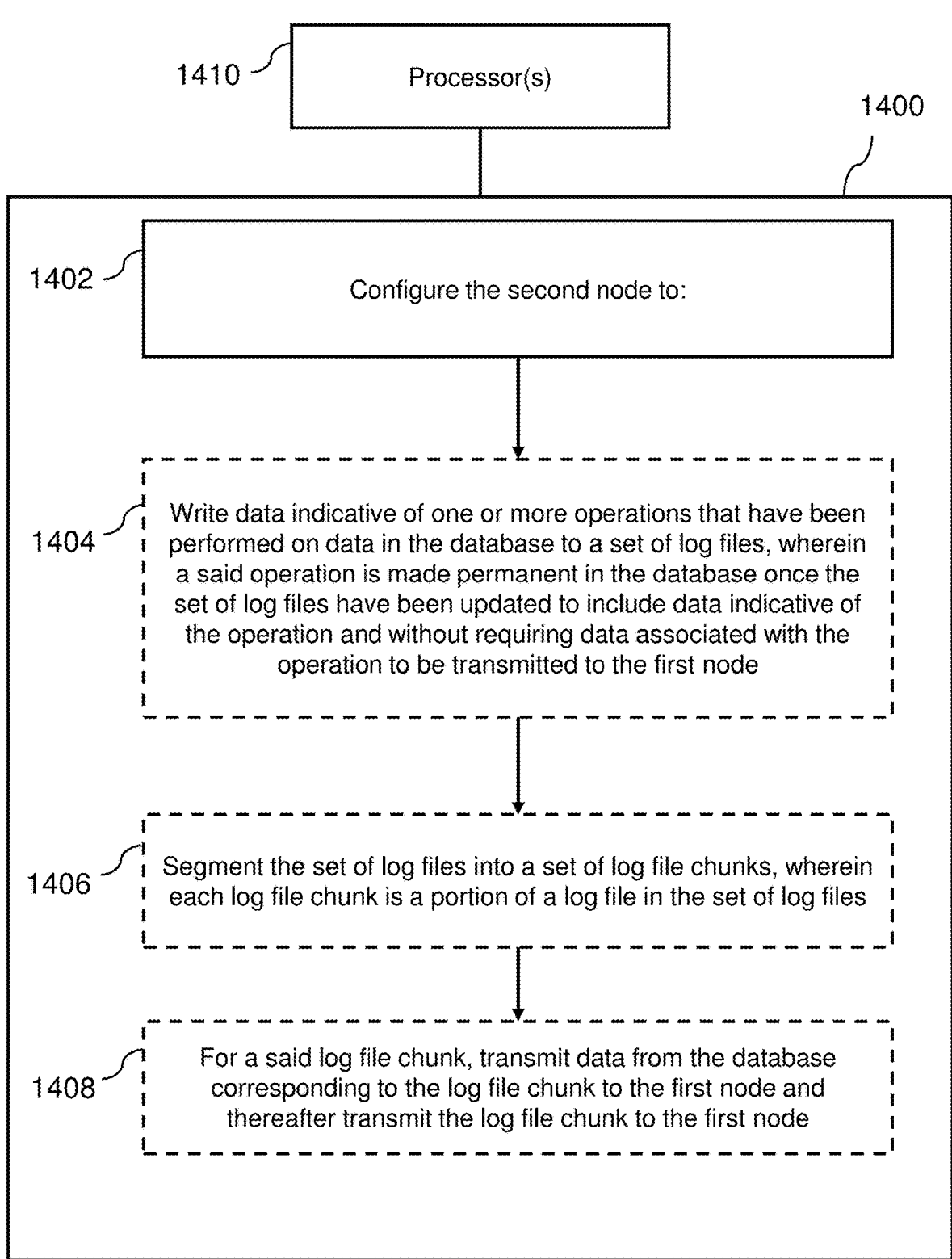

1410 — Processor(s)

1400

1402 — Configure the second node to:

1404 — Write data indicative of one or more operations that have been performed on data in the database to a set of log files, wherein a said operation is made permanent in the database once the set of log files have been updated to include data indicative of the operation and without requiring data associated with the operation to be transmitted to the first node 1406 — Segment the set of log files into a set of log file chunks, wherein each log file chunk is a portion of a log file in the set of log files 1408 — For a said log file chunk, transmit data from the database corresponding to the log file chunk to the first node and thereafter transmit the log file chunk to the first node

*FIG. 14*

SEPARATION OF STORAGE AND COMPUTE IN DATABASE MANAGEMENT SYSTEMS

CROSS-REFERENCE TO RELATED APPLICATIONS

This application is a continuation under 35 U.S.C. § 120 of U.S. application Ser. No. 17/559,491, filed Dec. 22, 2021. The above-referenced patent application is incorporated by reference in its entirety.

BACKGROUND OF THE INVENTION

Field of the Invention

The present application relates to database management systems, and more specifically, methods and systems for increasing the efficiency of relational database management systems.

Description of the Related Technology

As technologies advance, the amount of information stored in electronic form, the desire for real-time, or pseudo real-time, the ability to search, organize, and/or manipulate such information is ever increasing. Database management systems, sometimes also referred to as databases and data warehouses, organize data in a form that facilitates efficient search, retrieval, and/or manipulation of selected information. Typical database management systems allow a user to submit a "query" or call one or more functions in a query language for searching, organizing, retrieving, and/or manipulating information that satisfies particular conditions.

Certain databases may be transactional, which is to say their primary purpose is to record transactions. Such transactions may be thought of as one or more operations performed on data, in logs. A log may comprise a continuous stream of log records each log record corresponding to a transaction. This may allow transactions to be replayed or undone following an event such as a system crash. Logs may also be used to replicate databases by sending logs between databases and performing the transactions recorded therein to replicate a database, as described in Applicant's co-pending application Ser. No. 16/382,017, which is incorporated by reference in its entirety. Log records may be stored in log files which are periodically updated and truncated. When performing a transaction, the log files may be grown as log records are generated. When a log file becomes full a second log file may be generated. In some database systems, snapshots may be used to restore or replicate databases by initializing a state of the database from a snapshot and replaying only those transactions that were performed at a time after the snapshot was generated.

Certain databases may additionally, or alternatively, be analytical, which is to say their primary purpose is to execute queries and generate analytics on data stored in the database. Demands on database systems may vary and to handle increased demand, database systems may be scaled up (and down) by increasing (and decreasing) the resources of an existing server by increasing (or decreasing) the memory or upgrading the CPUs. Scale-out database systems increase the capacity by adding new nodes, for example in the form of new machines, to the database system.

Multiple instances, or replicas, of a database may be running at the same time to allow multiple users to run transactional and/or analytical work loads data stored in the database. It would be desirable to provide a system which is capable of handling both analytical and transactional workloads efficiently, for a plurality of users.

SUMMARY

According to a first aspect of the present disclosure there is provided a method for managing data in a database management system, the database management system comprising a first node, the first node being a master storage node for storing data from a database, and a second node, the second node performing operations on data stored in the database, wherein the operations include reading or writing the data, wherein the method comprises configuring the second node to: write data indicative of one or more operations that have been performed on data in the database to a set of log files, wherein a said operation is made permanent in the database once the set of log files have been updated to include data indicative of the operation and without requiring data associated with the operation to be transmitted to the first node; segment the set of log files into a set of log file chunks, wherein each log file chunk is a portion of a log file in the set of log files; and for a said log file chunk, transmit data from the database corresponding to the log file chunk to the first node and thereafter transmit the log file chunk to the first node, wherein the second node segments the set of log files and transmits the log file chunks and associated data to the first node asynchronously to its updating of the set of log files.

The database management system of the present disclosure aims to provide a database management system which supports many of the benefits of both shared-everything and shared-nothing database management systems, described further in the specific description below. In particular, providing a first node as a master storage node enables high availability of the data in the database, such that a plurality of nodes can efficiently and quickly access the data stored in the database from the first node. At the same time, allowing operations performed in the second node to be made permanent, before their associated data is transmitted to the master storage node, means that transactional workloads, including a large number of individual operations on data in the database, are not delayed by a need to write each individual operation to the first node before completion. In order to be able to safely and reliably manage the durability of data which is only periodically backed up to the first node, the log files are segmented into log file chunks so that they can be more frequently and quickly transmitted to the first node for storage. This means that although the second node can complete operations before they have been backed up to the first node, an asynchronous background thread ensures that the data of the second node is quickly and continuously backed up to the master storage node. Providing backup asynchronously to the operations performed at the second node, allows the resources used by the backup thread to be variable, accounting for the available resources in the second node. Where there is a highly demanding workload being run on the second node, the backup process may slow down to free up resources for the workload. When the workload is using fewer computing resources, the backup thread may increase the amount of resources it is using in order to catch up to the workload.

According to a second aspect of the present disclosure there is provided a database management system comprising a first node, the first node comprising at least one processor and storage comprising first computer-executable instructions which, when executed by the at least one processor, cause the first node to implement a master storage node for storing data from a database; and a second node, the second node performing operations on data stored in the database, the operations comprising reading or writing the data, wherein the second node comprises at least one processor and storage comprising second computer-executable instructions which, when executed by the at least one processor of the second node, cause the second node to: write data indicative of one or more operations that have been performed on data in the database to a set of log files, wherein a said operation is made permanent in the database once the set of log files have been updated to include data indicative of the operation and without requiring data associated with the operation to be transmitted to the first node; segment the set of log files into a set of log file chunks, wherein each log file chunk is a portion of a log file in the set of log files; and for a said log file chunk, transmit data from the database corresponding to the log file chunk to the first node and thereafter transmit the log file chunk to the first node, wherein the second node segments the set of log files and transmits the log file chunks and associated data to the first node asynchronously to its updating of the set of log files.

According to a third aspect of the present disclosure there is provided a non-transitory computer-readable storage medium comprising computer-executable instructions which, when executed by at least one processor, cause the at least one processor to: implement a first node, the first node being a master storage node for storing data from a database; implement a second node for performing operations on data stored in the database, the operations comprising reading or writing the data, the second node being configured to: write data indicative of the one or more operations that have been performed on data in the database to the set of log files, wherein a said operation is made permanent in the database once the set of log files have been updated to include data indicative of the operation and without requiring the data associated with the operation to be transmitted to the first node; segment the set of log files into a set of log file chunks, wherein each log file chunk is a portion of a log file in the set of log files; and for a said log file chunk, transmit data from the database corresponding to the log file chunk to the first node and thereafter transmit the log file chunk to the first node, wherein the second node segments the set of log files and transmits the log file chunks and associated data to the first node asynchronously to its updating of the set of log files.

BRIEF DESCRIPTION OF THE DRAWINGS

FIG. 5 is a flow diagram showing a method according to examples.

FIG. 14 is a schematic diagram illustrating a non-transitory computer-readable storage medium according to examples.

DETAILED DESCRIPTION OF CERTAIN INVENTIVE EMBODIMENTS

Details of systems and methods according to examples will become apparent from the following description, with reference to the Figures. This description includes numerous specific details of certain examples for the purpose of explanation. Reference in the specification to "an example" or similar language means that a particular feature, structure, or characteristic described in connection with the example is included in at least that one example, but not necessarily other examples. It should be further noted that certain examples are described schematically with certain features omitted and/or necessarily simplified for ease of explanation and understanding of the concepts underlying the examples.

Figure 1:
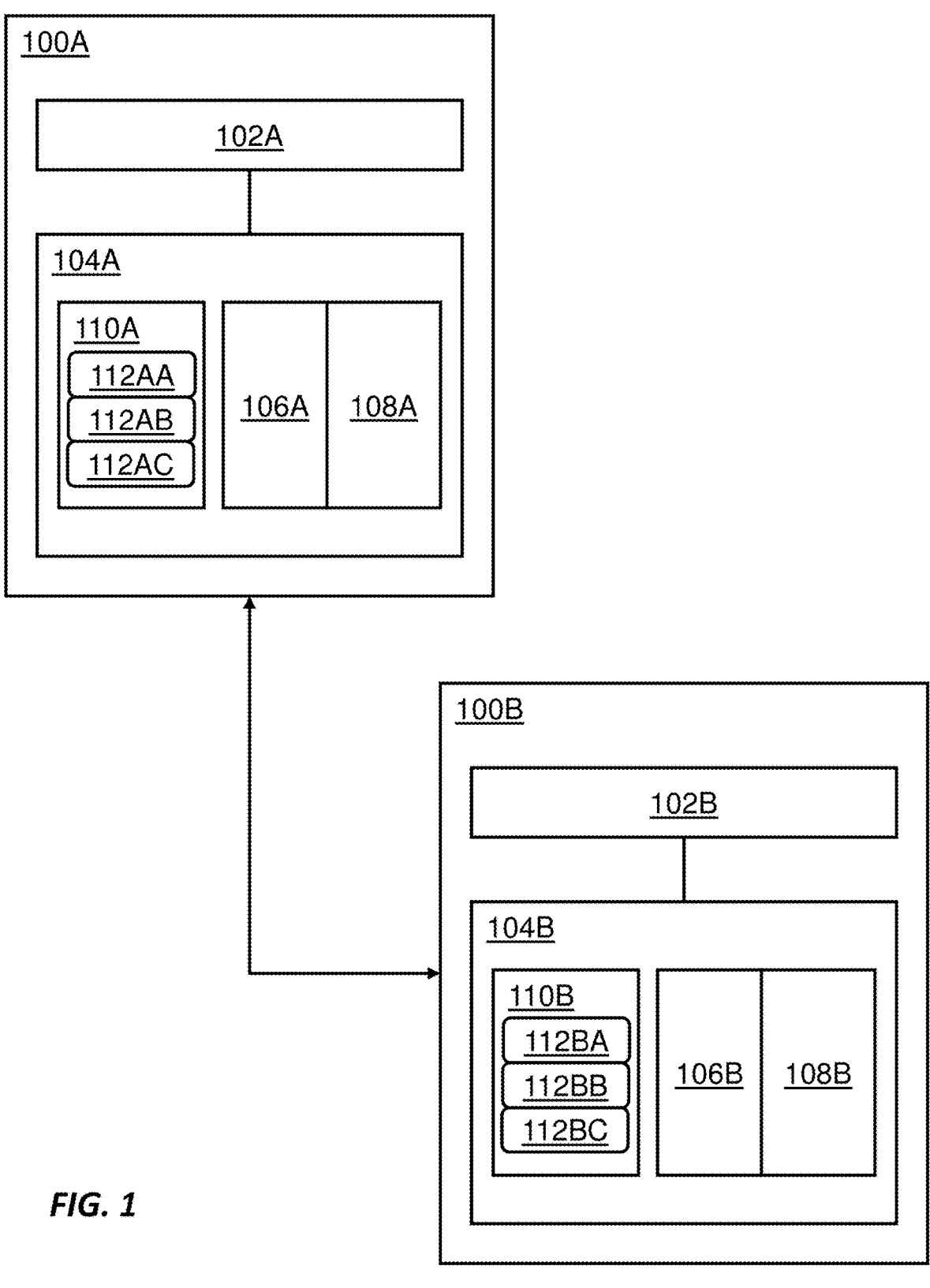
FIG. 1 is a schematic diagram showing a computer system implementing an instance of a database according to known database management systems.

FIG. 1 shows a computer system 100A storing data in a database according to known examples. As explained above a database may generally be considered as an organized collection of data stored electronically in a computer system 100A. The computer system 100A comprises a set of one or more processors 102A, and storage 104A. The storage 104A may include a combination of non-volatile storage and volatile storage e.g. in the form of hard disk drives, solid state drives, tape storage and other non-volatile storage and/or random access memory (RAM) and other volatile storage.

The database may include a combination of structured data 106A, such as data stored in row store and column store formats, and unstructured data 108A, such as a binary large objects, which may be referred to as blobs. The row store format data is stored in-memory, and is persisted to non-volatile storage, such as disk, using periodic snapshots of the in-memory data and log files 110A. The snapshots are stored as part of the data 106A and 108A in the database. The column store format data is persisted to disk column by column with each column stored in a data file on disk with a best fit compression scheme applied. The database includes a transaction log, implemented using a collection of log files 110A, which are used to record transactions performed on data in the database. The log files 110A include log records 112AA to 112AC. Each log record 112AA represents a single logical operation, which may also be referred to as a transaction, such as a read or write operation, performed on data in the database. A transaction is a unit of work performed within a database system on data stored therein. Transactions may be a single unit of logic or work performed on data stored in the database and can comprise one or more physical operations like a read and/or write operation on data. To maintain reliability and consistency in a database, transactions are atomic, consistent, isolated, and durable. These properties may be generally referred to as the ACID properties.

Generally, multiple users may desire to use the database to run their own respective workloads on the data stored therein. In computing, a workload is a term used to generally describe programs or applications that run on a computer. There are limits on the input and output bandwidth which can be used when communicating with the computer system 100A and instructing it to run a workload. These limits are dictated by the physical limitations of the hardware used to implement the computer system 100A, including the available processing power, memory, and bandwidth for receiving and transmitting data. Due to these limitations, different instances of the database are generally created in order to allow multiple users to access and use the data at the same time.

A computer system 100B which implements a replica of the database implemented by the first computer system 100A is also shown in FIG. 1 wherein elements of computer system 100B which correspond to similar elements in the first computer system 100A are provided with the same prefix and a respective suffix. For example, 104A and 104B both represent storage. In order to replicate the database at the second computer system 100B, a snapshot is sent from the first computer system 100A to the second computer system 100B, along with the log files 110A. The second computer system 100B loads the received snapshot and uses the log files 110B, now stored on the second computer system 100B, to re-run operations which were performed after the received snapshot was taken.

Implementing a database in this way has a number of limitations which can restrict the usefulness of the database. First, it is to be noted that computing resources of the first computing system 100A are required when transmitting data to a new replica, and managing and monitoring the delivery of this data to the second computer system 100B. Second, and as discussed above, there is in any event a finite amount of bandwidth available for inputting and outputting data to the computer system 100A when attempting to run a new workload. Therefore, when replicating the database at the second computing system 100B, the available bandwidth for such read/write operations may reduce when creating new instances of the database or updating these other instances of the database.

Other limitations of managing a database in this way include a lack of flexibility in providing resources to new users and making the data of the database available for these users, since it takes time to create a new replica of the database and to make it available to a user. This means that there can be delays in making a database available to a user. This limitation is more severe where there is a large amount of data in the database, since the second computing system 100B will need to be provided with a large amount of computing resources, such as processing power, memory, and storage, in order for the second computing system 100B to operate effectively. Procuring or allocating these resources can take time, and it is more difficult and expensive when the amount of resources which need to be provided are large. The time taken to transfer the data to the second computing system 100B is also increased where there is a large amount of data in the database.

Further limitations include the need to continuously grow the storage capacity of the computing systems 100A and 100B as the size of the database increases. In many cloud-based computing systems, users are charged based on the amount of storage which they are assigned. Having to increase the storage capacity of all of the computer systems 100A and 100B which are being used can lead to increased costs. Further it can take time to provision more storage capacity for each computer system 100A and 100B and this can lead to a slow down in workloads and/or specific transactions as operations are put on halt while the storage capacity is increased.

There are some database systems which aim to alleviate the impact of some of these limitations. These solutions generally fall into two categories: shared-everything database systems, and shared-nothing database systems. Shared-everything database systems aim to mitigate these limitations by providing centralized storage for all instances of the database. In shared-everything database systems, a centralized storage node is used to store all data in a database, while individual instances of the database, or "nodes", are operated by users to query and instruct operations to be performed on the database. These nodes are able to query data stored in the centralized storage node.

While shared-everything database systems are able to alleviate some of the limitations of previous database systems, such as the need to grow the storage capacity provided in each node, they introduce some of their own limitations which make them unsuitable for a number of applications. In particular, in order for consistency and durability in the database, it is generally necessary for all transactions on data in the database to be fully propagated to the centralized storage node before the transaction can be made permanent. That is to say, although a transaction may be performed on a remote node, operated by a user, all of the data relating to that transaction needs to be transmitted to the centralized storage node before that transaction can be considered to be completed. A transaction is said to be "committed" once it has been fully completed or made permanent. This introduces an extra step of input and output processing which needs to be performed for every transaction, as the data has to be transmitted to the centralized storage node and a confirmation needs to be received, before the transaction is committed.

The centralized storage node may not be provided at the same location as each of the individual nodes which are operated by users. For example, the centralized storage node may be stored on a server located at one specific location, while the nodes which are to be operated by the users may be located in geographically remote locations, which are near to these users in order to reduce the latency when the users access these nodes. This means that for each transaction, data relating to that transaction needs to be transmitted, generally over a network such as the internet, to the centralized storage node.

Certain workloads have different characteristics which can affect the performance of the workload depending on the underlying architecture of the database system. For example, some workloads may be highly transactional, meaning that they involve a large number of writes to the database. Other workloads may be more analytical, meaning that they involve performing analysis on data stored in the database. Some highly transactional workloads can require thousands, or millions, of writes per minute. The delay introduced by having to propagate every transaction to the centralized storage node before it is committed can make shared-everything database systems unsuitable for highly transactional workloads.

Shared-nothing database systems provide a plurality of nodes each of which is responsible for a subset of the data in the entire database. That is to say, the database is distributed across all of the nodes with no single node having access to all of the data included in the database. Shared-nothing database systems may provide increases in efficiency for some specific workloads, such as where the data to be used for a particular workload can be easily separated from other data included in the database and/or where operations performed on the data are parallelizable. Where operations are parallelizable different nodes can perform respective operations on their portions of the data in parallel with operations performed on other nodes. However, where the data in the database is highly relational or large portions of the data which are to be operated on overlap multiple nodes, shared-nothing database systems will share many of the same input and output bandwidth restrictions as previous database systems. Shared-nothing database systems also generally are not as elastic, or as capable of being scaled up, as other database system architectures. When adding new computing resources to the database system, data needs to be moved to the new computing resources from other nodes which puts strain on the input and output resources of those nodes.

The examples described below in relation to FIGS. 2 to 13, describe specific implementation details of a new database management system which aims to provide an efficient, flexible, and scalable database management system which is suitable for a variety of different types of workloads, including highly transactional and highly analytical workloads.

Figure 2:
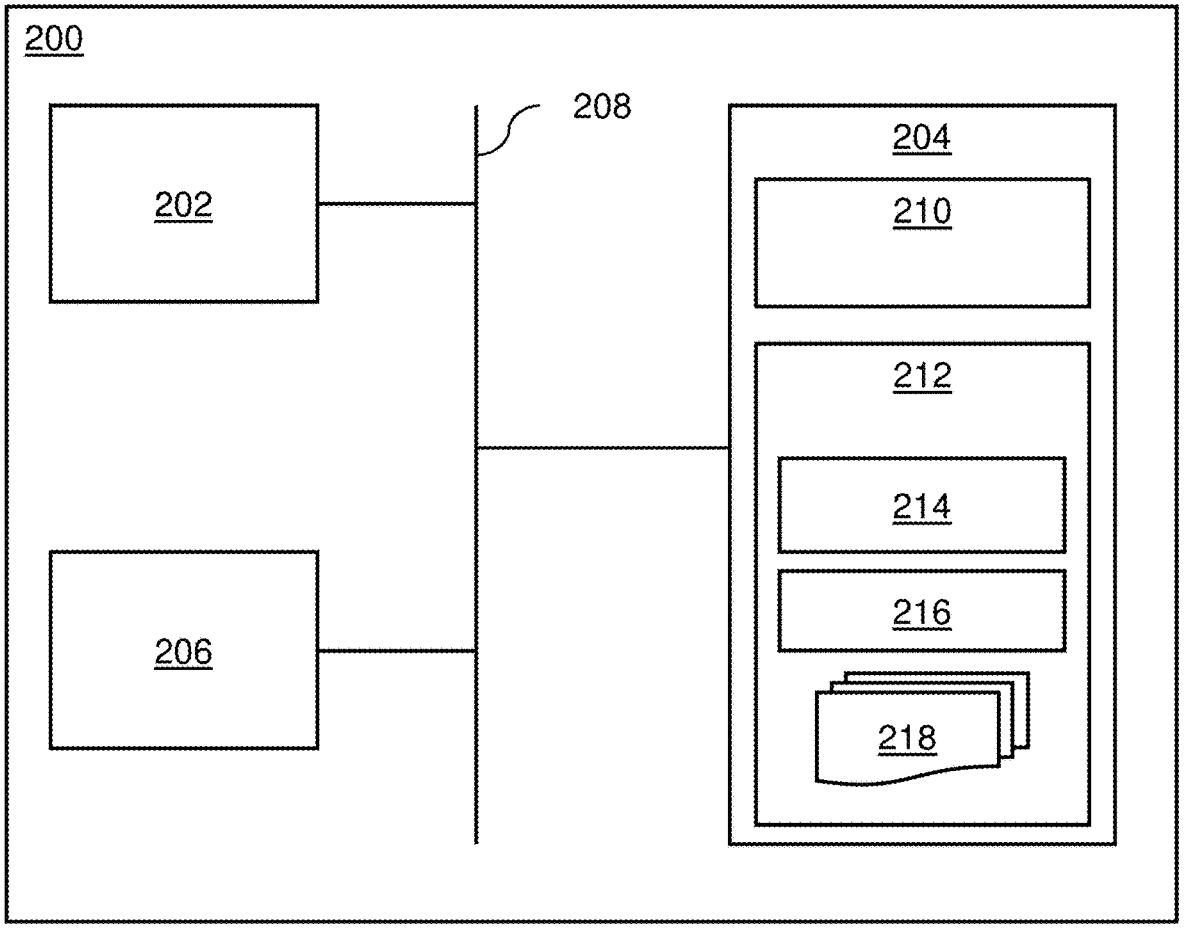
FIG. 2 is a schematic diagram showing a master storage node for storing data from a database according to examples.

The database management system described herein comprises a master storage node, shown in FIG. 2 and generally referred to as a first node 200, which acts as a centralized storage facility for storing the data of the database. The master storage node 200 may implement object, or blob, storage which is an inexpensive form of storage which can easily and quickly be expanded based on the storage requirements of the database. The database management system also includes a second node 300, shown in FIG. 3, that may be operated by a user. The second node 300 implements a primary instance, or primary replica, of the database. The data of the database, which is operated on in the second node 300, is replicated to the master storage node 200 to provide a centralized repository of the data of the database. Transactions performed in the second node 300 can be committed before the associated data is transmitted to the first node 200. In this way, highly transactional workloads which are performed on the second node 300 are not held up by the need to persist the transactions to the master storage node 200 before being committed, in contrast to the features of a typical shared-everything database management system.

The data in the database, and the record of transactions in the log files, are then replicated to the master storage node 200 asynchronously, using background processes. Older data, or data which is not being actively used, in the second node 300 can be deleted as a copy of this data exists in the first node 200. This allows the second node 300 to be provided flexibly and without having to increase its storage facilities as the size of the database increases.

Further nodes can also be flexibly provided for specific uses and/or for specific periods of time. This means that these further nodes can be quickly provisioned and/or taken offline depending on an instantaneous need. These further nodes can be configured with computing resources which match their need. That is to say that the further nodes can be provided with sufficient memory, processing power, and storage for running their associated workloads and without providing more resources than is necessary. These further nodes download relevant portions of the database to run their own workloads and can be put offline, or removed, once their workloads have been run. These further nodes download the relevant data from the first node 200 and, if necessary, the second node 300. Generally the majority of the data which a further node will need is provided from the first node 200, and so replicating the database when using these further nodes does not have as great an impact on the input and output bandwidth of the second node 300, as compared to previous database management systems in which secondary replicas of a database are replicated directly from the primary replica of the database.

To enable the database management system to operate in this way, a number of specific changes are made to the specific processes and sub routines used to backup, replicate, and create snapshots of the data in the database. These changes help to ensure that the data and transactions maintain their ACID properties, and that the management of the database is performed efficiently. Methods relating to the changes in these processes are described below with reference to FIGS. 5 to 13.

Returning to FIG. 2, the first node 200, or master storage node, comprises one or more processors 202, storage 204, and one or more communications modules 206. The processor(s) 202, storage 204 and communication module(s) 206 are communicatively connected over an interface 208, for example a bus. The processor(s) 202 includes any suitable combination of processing circuitry which is configurable to perform the functions described herein with reference to FIGS. 5 to 13. For example, the processor(s) 202 may include CPUs, GPUs, NPUs, ASICs, fixed function processing circuitry or any combination of these.

The storage 204 includes a combination of volatile storage 210, or memory, and non-volatile storage 212, which may be referred to as disk storage. The volatile storage 210 includes any suitable combination of one or more volatile storage types, for example, the volatile storage 210 may include a combination of RAM, SRAM, and/or DRAM. While the volatile storage 210 is shown as being included in the storage 204 and separate from the processor(s) 202 in some cases the volatile storage 210 may be directly attached to or integrated with the processor(s) 202.

The non-volatile storage 212, while sometimes being referred to as "a disk" or "disk storage", may include any suitable combination of non-volatile storage types. For example, the non-volatile storage 212 may include hard disk drives, solid state drives, flash memory, magnetic tape storage, or any combination of these storage types. In some cases, the non-volatile storage 212 may include hierarchical storage, in which different storage types are used to store data according to a respective age and/or frequency of access of the data. For example, solid state drives may be used to store data which is frequently accessed, or which is likely to be accessed frequently. While hard disk drives, or tape storage, which have a higher read/write latency than solid state drives or flash memory, may be used to store data which is older or less likely to be accessed frequently.

The non-volatile storage 212 is used to store instructions 214 which, when executed by the processor(s) 202, cause the processor(s) 202 to implement the functions described herein with respect to FIGS. 5 to 13. The non-volatile storage 212 also stores a set of data files 216, including snapshots of the database, binary large objects, and column store files representing column store format data of the database. A transaction log 218 is also provided in the non-volatile storage 212 for maintaining a record of transactions in the database.

Figure 3:
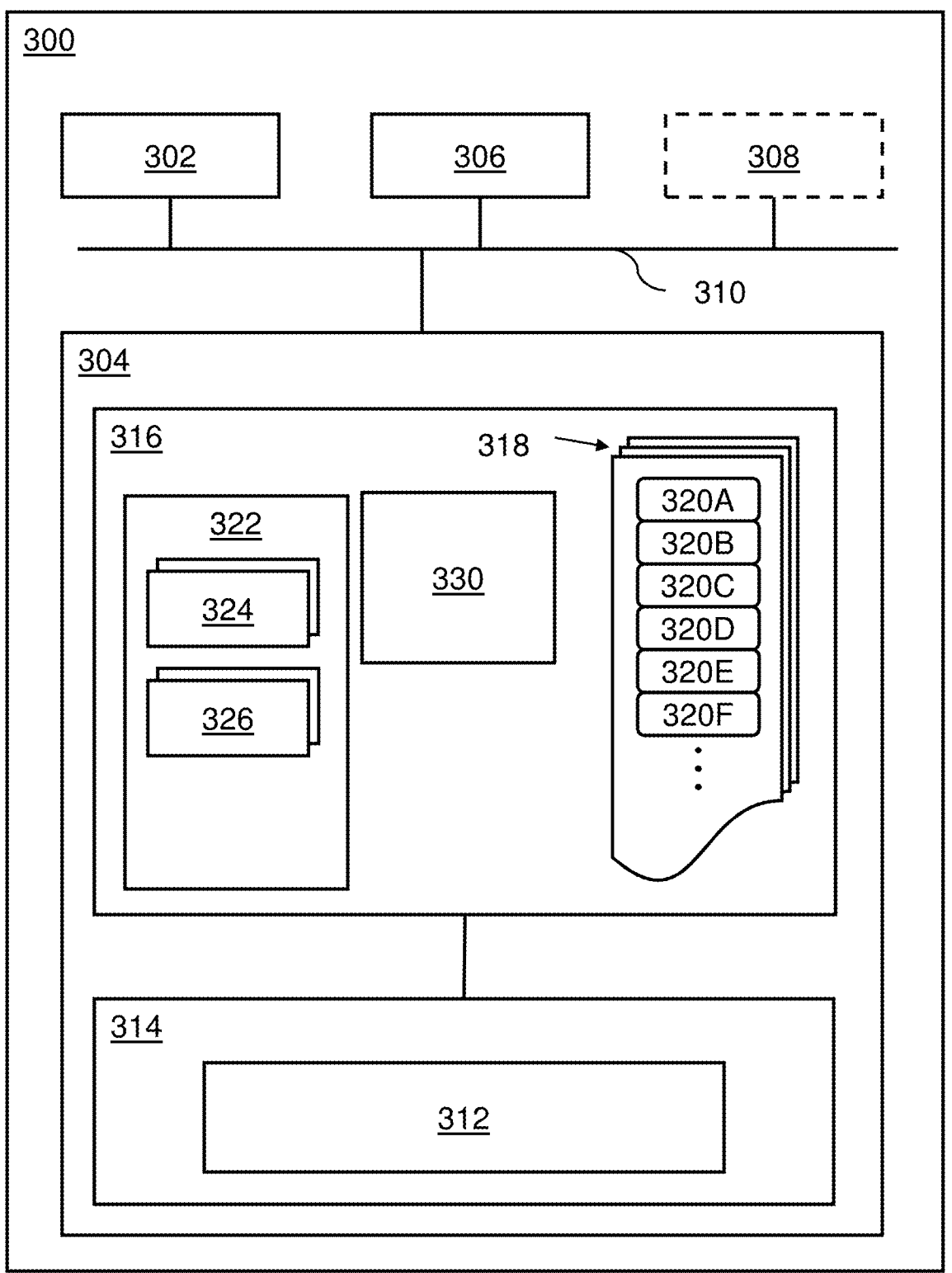
FIG. 3 is a schematic diagram showing a node which is configured to perform operations on data stored in a database according to examples.

Turning to FIG. 3, the second node 300 comprises one or more processors 302, storage 304, one or more communications modules 306, and in some cases a user interface 308 all of which are connected over an interface 310, such as a bus. The physical characteristics of the processor(s) 202, storage 204, and communications modules 206 described above in relation to the first node 200 also apply to the processor(s) 302, storage 304, and communications modules 306 of the second node 300. The term "node" has been used to reference the first node 200 and second node 300 in the examples described herein as each of these systems appear logically in a computer network as being a single entity. However, it is to be appreciated that each of these nodes 200 and 300 may in fact be implemented by a collection of physically separated computers or as different volumes, or virtual machines, implemented on a single computing device. As such, the nodes 200 and 300 may also be referred to as clusters, wherein a cluster is a group of interconnected computers or computing resources that work together to support specific applications. The resources provided in the first node 200 and the second node 300, such as the processing power, amount of storage, and so forth, may be dynamic. The amount of resources provided in the first node 200 and the second node 300 may change either based on the instruction of a user, or in response to a measure of performance of the respective node 200, 300.

The second node 300 stores computer-executable instructions 330 in the non-volatile storage 316 which, when executed by the processor(s) 302 cause the processor(s) 302 to perform a process as will become apparent from the description provided below with respect to FIGS. 5 to 13.

In some examples, the second node 300 comprises a user interface 308 for obtaining instructions from a user. The user interface 308 may include any suitable hardware for this purpose such as a digital display device, one or more input devices such as a keyboard or mouse, and so forth. In some examples, the user interface 308 is integrated with the communication module(s) 306 to provide an interface to a user over a network, such as the internet. In other examples, the second node 300 may be in communication with one or more further computer devices, via the communication module(s) 306, with those further computer devices providing an interface for a user.

Figures 4A, 4B:
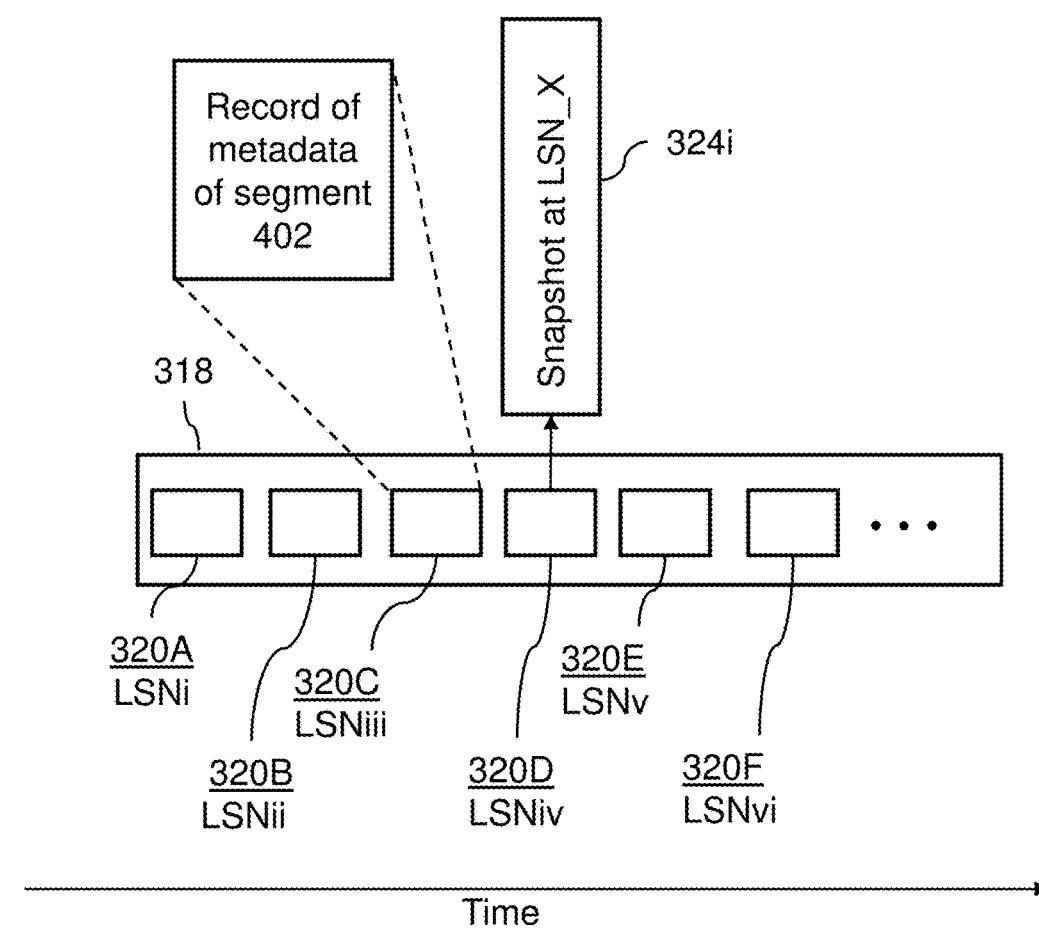
FIG. 4A is a schematic diagram showing a schema for row store data format in a database.
FIG. 4B is a schematic diagram showing a schema for column store data format in a database.

The second node 300 uses the storage 304 to implement a combination of row store format and column store format data storage. A schema for managing both row store format and column store format data in the database is illustrated in FIGS. 4A and 4B. A specific example of how a combination of row store and column store format data can be managed in a database management system is described below with respect to FIGS. 3 to 4B, although it is to be appreciated that the subsequent description of methods relating to FIGS. 5 to 13 are applicable to more implementations of database management systems than those described here, which are provided for exemplary purposes.

In the example of FIGS. 3, 4A, and 4B row store data 312 is stored in-memory 314 to enable fast access and writes of the row store data 312. The row store data 312 is persisted to non-volatile storage 316 in the form of the transaction log, implemented by a set of log files 318. The log files 318 comprise a plurality of log records 320A to 320F, each log record 320A to 320F representing a single operation, or transaction. Each log record 320A to 320F is associated with a respective log sequence indicator. The log sequence indicators, or the position of log records in 320A to 320F in the log files 318, represent a relative order of each operation with respect to other operations performed on data in the database. In some examples, these log sequence indicators are log sequence numbers, which are referred to as LSNs.

The non-volatile storage 316 also includes a set of data files 322 comprising snapshots 324 of the database, and binary large objects 326. A binary large object is a collection of binary data and in the examples described herein may typically include column store files. In other examples a binary large object may alternatively or additionally comprise images, audio, and other multimedia objects. The snapshots 324 are used to checkpoint the transaction log by periodically creating a copy of the in-memory state of the database, i.e. the row store data 312, to disk 316. As described above, each log record 320A to 320F is associated with a respective log sequence indicator LSNi to LSNvi. A respective snapshot log record 320D is created in the log files 318 for each snapshot 324$i$ that is generated. The log sequence indicator LSNiv associated with the snapshot log record 320D provides an indication of which data is included in the snapshot 324$i$. That is to say that log records 320A to 320C having a log sequence indicator LSNi to LSNiii representing an earlier position in the transaction log than the snapshot log record 320D will be included in the snapshot 324$i$. FIG. 4A illustrates this process in which a snapshot 324$i$ is taken of the in-memory state of the database, and the transaction log, implemented as the set of log files 318 continues to record operations after the snapshot 324$i$. This process is repeated periodically, for example, another snapshot (not shown) may be generated after a predetermined amount of time has elapsed, or after a predetermined number of operations have been performed, since a previous snapshot 324$i$.

A binary large object 326, in the form of column store format data, is handled differently to row store format data 312. Column store format data 326 is written out to the non-volatile storage 316 column by column. Each column may be stored in a data file $C_1, C_2, C_3, C_4$ on the non-volatile storage 316, and a best fit compression algorithm may be applied to reduce the size of the column store data files $C_1$, $C_2, C_3, C_4$. A set of column store data files $C_1, C_2, C_3, C_4$ representing a number of compressed rows is called a segment 402. Metadata referring to each segment 402 is stored in the row store data 312 along with a bitmap such that the column store data 326 logically exists in the row store data, but is physically stored as files $C_1, C_2, C_3, C_4$ on disk 316. As the metadata referring to a segment 402 is stored in the row store data 312, there will be a corresponding log record 320C associated with an operation to write that metadata into the row store data 312. The column store data files $C_1, C_2, C_3, C_4$ may be named after the log sequence indicator LSNiii corresponding to the log record 320C associated with the operation to write the metadata of the segment 402 into the row store data 316. This allows the column store data files $C_1, C_2, C_3, C_4$ associated with a log record 320C to be easily identified.

Figure 6:
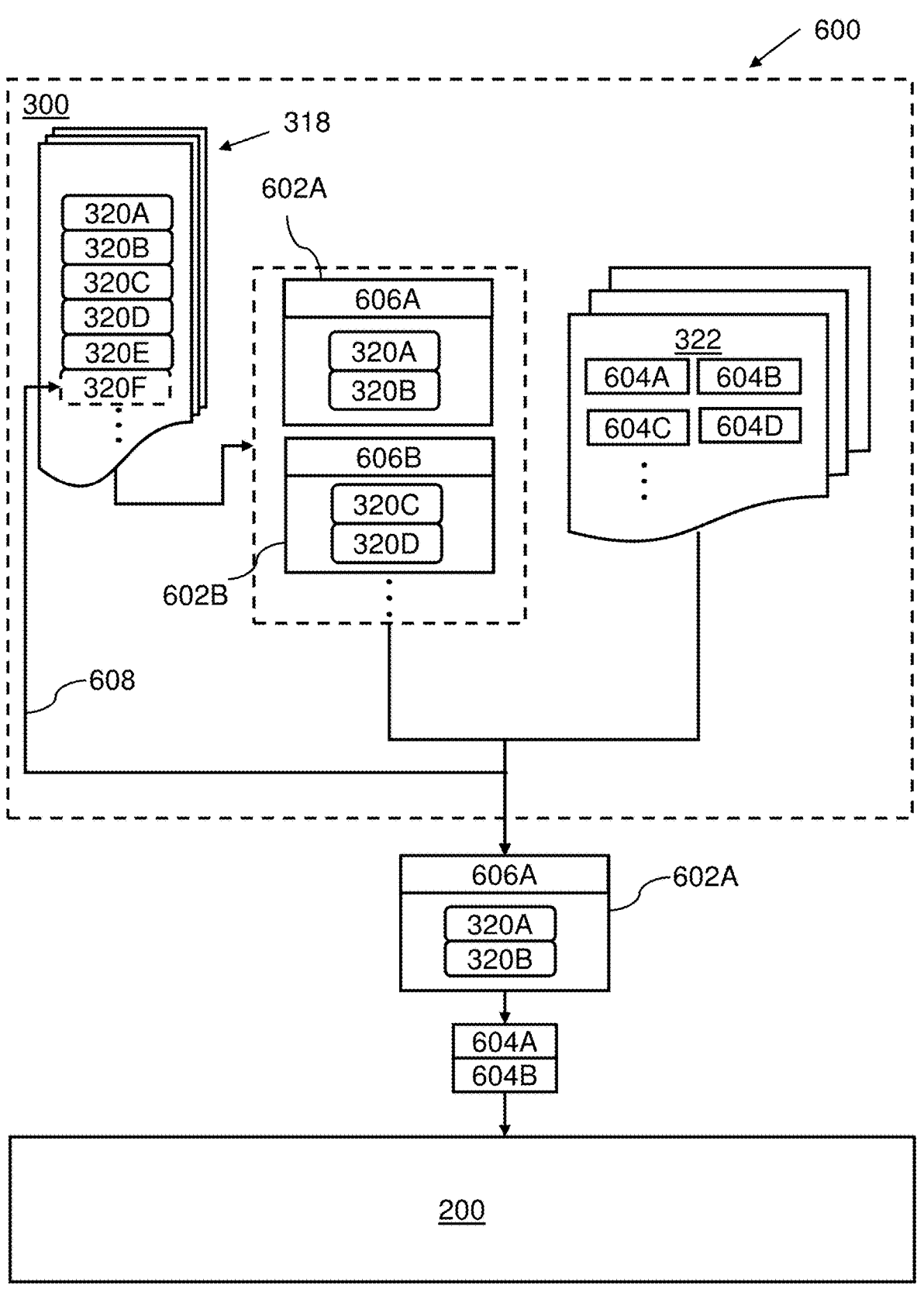
FIG. 6 is a schematic diagram showing the method of FIG. 5, according to examples.

Turning now to FIGS. 5 and 6, a method 500 for managing data in a database management system 600 will be described. The database management system 600 comprises the first node 200 and the second node 300 as described above in relation to FIGS. 2 and 3. The first node 200 is a master storage node for storing data from a database and the second node 300 is for performing operations on data stored in the database, wherein the operations involve reading and/or writing data. The method 500 comprises configuring 502 the second node 300 to perform a process described below in relation to the blocks 504 to 508 shown in dotted lines in FIG. 5.

Configuring the second node 300 may involve providing the second node 300 with the set of instructions 330 which, when executed by a processor 302, cause the processor 302 to perform blocks 504 to 508, which start with writing 504 data that is indicative of one or more operations that have been performed on data in the database to a set of log files 318. For example, the log records 320A to 32° F. may be written into the log files 318, each log record 320A to 320F representing an operation that has been performed on data stored in the database.

Operations performed on data are made permanent, or committed, in the database once the set of log files 318 have been updated to include data indicative of the operation. For example, an operation may be made permanent once a corresponding log record 320A to 320F has been written into the log files 318. When writing a log record 320A to 320F to the set of log files 318, an initial entry may be opened in the log files 318 in order to start recording the operation, but this record 320A to 320F is not completely written out until the operation is completed. As such, operations on data, performed on the second node 300, may be made permanent in the database without requiring data associated with the operation to be transmitted to the first node 200. The data associated with the operation may include, for example, associated blobs 326, in the form of column store data files, or row store data 312.

The set of log files 318 are segmented 506 into a set of log file chunks 602A, 602B. Only two log file chunks 602A, 602B are shown in FIG. 6 so as not to over complicate the figure. Each log file chunk 602A, 602B is a portion of a log file in the set of log files 318. A process for backing up the database to the first node 200 is performed on a per log file chunk 602A, 602B basis. For each log file chunk 602A, data 604A, 604B in the database corresponding to the log file chunk 602A is transmitted to the first node 200. The log file chunk 602A associated with the data 604A, 604B is transmitted to the first node 200 after the data 604A, 604B.

In the example shown in FIG. 6, a first log file chunk 602A comprises two log records 320A and 320B which are associated with corresponding data files 604A and 604B respectively. These data files 604A and 604B may be column store data files, binary large objects or other data files which have corresponding log records 320A and 320B in the log files 318. The second log file chunk 602B comprises two log records 320C and 320D corresponding to data 604C and 604D respectively. In the example shown, each of the log file chunks 602A, 602B comprises a respective log file chunk name 606A, 606B used to reference the relevant log file chunk 602A, 602B.

Log files 318 generally have a fixed size which may be configured by an administrator of the database management system 600 or set automatically in the database management system 600. There is generally a trade off when selecting the size of a log file. Selecting larger file sizes for the log files 318 reduces the frequency of a given log file running out of file space when writing log records 320A to 320F. When a log file becomes full the database management system 600 will have to allocate space for, and create, more log files to record transactions. This can put a halt to transactions being committed while the further storage space is being allocated. Selecting smaller file sizes for the log files 318 allows the log files 318 to be more easily copied and transmitted to a replica of the database for backup purposes. This in turn can allow backups to occur faster and at a greater frequency.

By segmenting the log files 318 into a set of log file chunks 602A, 602B when performing the backup of the database, it is possible to obtain many of the benefits of both larger and smaller log file sizes. The log files 318 can be configured with a favorable, larger, size on the second node 300 while recording transactions in the database, thereby preventing frequent allocation of new log files. When transmitting the log files 318 to the first node 200 for backup, the log files 318 can be segmented into smaller log file chunks 602A, 602B allowing them to be sent to the first node 200 faster and with greater frequency. In some examples, the log files 318 are each provided with 256 megabytes (MB) of storage space to record transactions, although the exact storage space provided to each of the set of log files 318 may vary depending on the specific implementation and data stored in the database. The log file chunks 602A, 602B may be considerably smaller, for example, around 4 MB. In other examples, the log file chunks may be 32 MB. The size of the log file chunks may be selected such that each log file 318 is split into a plurality of log file chunks such as more than 8 log file chunks. The size of the log file chunks may be selected and/or modified on-the-fly.

Having the ability to increase the frequency and speed at which parts of the log files 318 and corresponding data 322 are transmitted to the first node 200 is particularly advantageous. This is because it allows the first node 200, which is a master storage node, to maintain a contemporary record of the database and also alleviates the need to transmit the data associated with every operation to the first node 200 before the operations can be committed on the second node 300. Although the operations may not be instantaneously backed up to the first node 200, the increased frequency with which the log records 320A to 320F are transmitted to the first node 200 enables the amount of data on the second node 300 which is not backed up to the first node 200 to remain small.

The second node 300 then segments 506 the set of log files 318 and transmits 508 the log file chunks 602A, 602B and associated data 604A to 604D to the first node 200, asynchronously to its updating of the set of log files 318. The process of segmenting 506 and transmitting 508 the log files 318 to the first node 200 may be performed by a background thread on the second node 300 which runs independently of any other workloads being run on the second node 300. For example, a user may be running one or more applications on the second node 300 to record and/or process data in the database. By backing up the database to the first node 200 asynchronously to the workloads being run by a user, the second node 300 and first node 200 are able to provide a database management system 600 which allows a robust and durable centralized storage resource for the database, while also providing fast and efficient transactions to be performed on the second node 300.

The second node 300 may update 608 the set of log files 318 to indicate how much of the log files 318, and the associated data files 604A to 604D, have been transmitted to the first node 200 for backup. To this end, the method 500 may involve configuring the second node 300 to write 608 a checkpoint log record 320F to the log files 318. The checkpoint log record 320F confirms that all log records 320A to 320B up to and including the log records 320A and 320B in the log file chunk 302 have been transmitted to the first node 200.

In some examples, a respective checkpoint log record 320F may be written into the log files 318 after every log file chunk 602A has been transmitted to the first node 200. In other examples, a checkpoint log record 320F may be written into the log files 318 periodically, or after a predetermined number of log file chunks 602A, 602B have been transmitted to the first node 200.

Keeping a record 320F in the log files 318 of how much of the transaction log has been transmitted to the first node 200, allows the second node 300 to establish how much of the database can be retrieved from the first node 200 following a failover of the database on the second node 300. Similarly, when creating a new replica of the database, it becomes possible to easily determine how much of the transaction log can be downloaded directly from the first node 200 and how much, if any, of the transaction log will need to be obtained from the second node 300.

Figure 7:
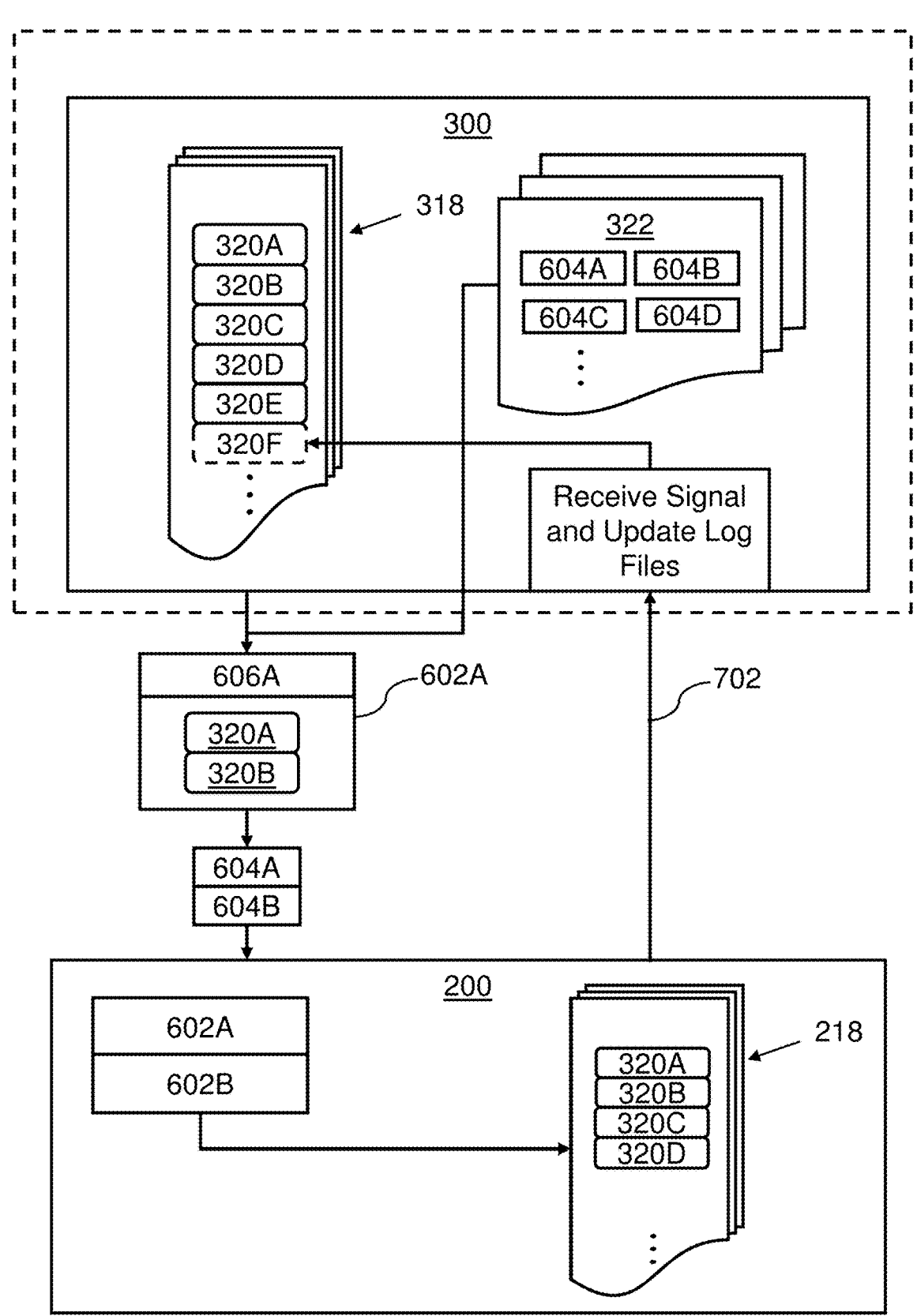
FIG. 7 is a schematic diagram showing the method of FIG. 5, according to examples in which the node of FIG. 3 receives a receipt from the master storage node shown in FIG. 2.

In some examples, such as those shown in FIG. 7, the checkpoint log record 320F, confirming that a respective log file chunk 602A has been transmitted to the first node 200, may be written into the log files 318 in response to a message from the first node 200. In the example of FIG. 7, the first node 200 may be configured to, on receipt of a log file chunk 602A, provide a signal 702 to the second node 300 confirming receipt of the log file chunk 602. Updating the log files 318 at the second node 300 to include the checkpoint log record 320F may be dependent on the second node 300 receiving the signal 702 confirming receipt of the log file chunk 602. As described above, the log file chunk 602A may be transmitted after the associated data files 604A and 604B have been transmitted to the first node 200. As such, confirming receipt of the log file chunk 602A also confirms receipt of the associated data 604A and 604B.

By uploading the data of the database using a background thread which operates asynchronously to the workloads running on the second node 300, it becomes possible to tune the speed at which data is backed up to the first node 200 in dependence on the resources available in the second node 300. For example, when a workload which requires a large amount of resources is run on the second node 300, the background process for transmitting log file chunks 602A, 602B to the first node 200 may slow down in order to provide increased resources to the workload. Once the resources used by the workloads are reduced, the background process 506, 508 backing up the data to the first node 200 may speed up to catch up with the workload.

The order in which log records 320A to 320F are written into the log files 318, and their respective log sequence indicators LSNi to LSNvi, may represent the order in which the associated operations have been performed. The method 500 may comprise configuring the first node 200 to receive the log file chunks 602A, 602B from the second node 300, and to reconstruct the set of log files 318 from the log file chunks 602A, 602B. Reconstructing the set of log files 318 may involve stitching together the log file chunks 602A, 602B such that the log records 320A to 320D are in the correct order. In this way, the first node 200 is able to maintain an accurate set of log files 318 representing the operations performed on data in a database in their respective order. This also enables the first node 200 to provide these log files 318 to further nodes in the correct order so that the further node can start replaying operations represented by the log records in the order they are received and before having received all of the set of log files 318.

Figure 8:
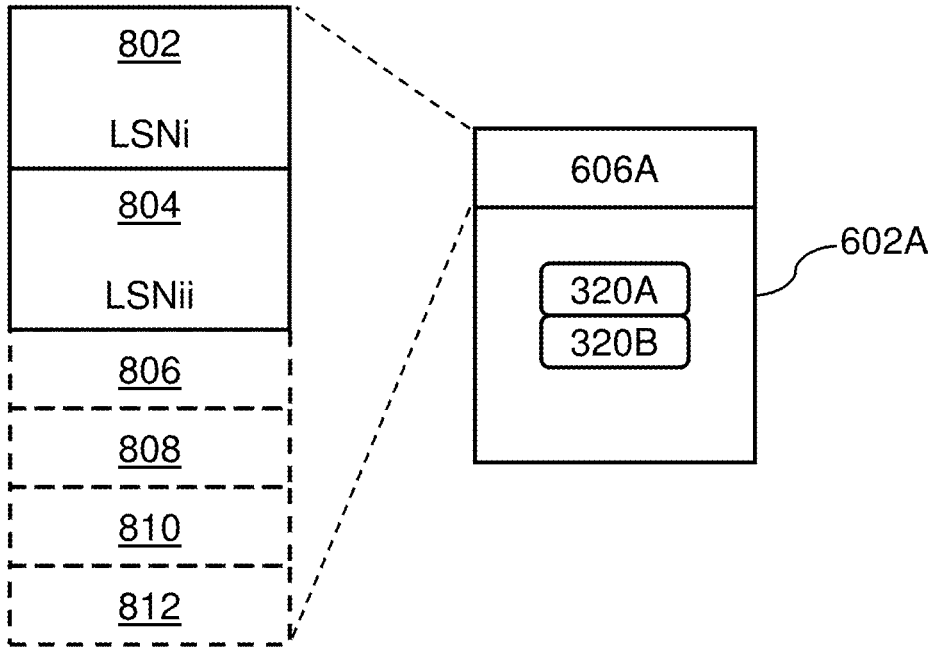
FIG. 8 is a schematic diagram showing a log file chunk according to examples.

FIG. 8 shows an example of the log file chunk 602A in which the filename 606A of the log file chunk 602A comprises metadata 802 to 812 which can be used to uniquely identify the log file chunk 602A and to accurately reconstruct the set of log files 318 from the log file chunks 602A, 602B. A first portion of the metadata 802 may include a first log sequence indicator LSNi and a second portion of the metadata 804 may include a second log sequence indicator LSNii. The first log sequence indicator LSNi may be a log sequence indicator representing an oldest log record 320A in the log file chunk 602A and the second log sequence indicator LSNii may be a log sequence indicator representing a newest log record 320B in the log file chunk 602. When reconstructing the set of log files 318 from the log file chunks 602A, 602B, the first node 200 may identify adjacent log file chunks 602A, 602B based at least on the respective first log sequence indicators LSNi and second log sequence indicators LSNii for each log file chunk 602A, 602B. For example, the first node 200 may identify the second log sequence indicator LSNii of a first log chunk 602A as being adjacent to a first log sequence indicator LSNiii of a second, later, log file chunk 602B.

The respective file names 606A, 606B for each log file chunk 602A, 602B may also include further metadata which can be used to efficiently and accurately identify a contiguous run of adjacent log file chunks 602A, 602B. For example, the metadata may additionally include an upload term indicator 806. A term defines a portion of the log that is defined between a previous failover or crash of the database and a next subsequent failover or crash. When a failover or crash occurs in the database a special start-of-term log record (not shown) may be generated in the set of log files 318 denoting the start of a new term. The upload term indicator 806 represents the term at which the respective log file chunk 602A is transmitted to the first node 200. Each log file chunk 602A, 602B may be transmitted to the first node 200 at a specific term and knowing the term at which a log file chunk 602A, 602B was transmitted to the first node 200 is useful when determining when there was a failover of the database between log file chunk 602A, 602B uploads.

Other metadata which may be included in the file name 606A of the log file chunk 602A includes a data term indicator 808, which indicates the term associated with the log records 320A and 320B in the log file chunk 602A. The upload term indicator 806 may represent a later term than the data term indicator 808, for example where there is a fail over or crash of the database between the log records 320A and 320B being written into the log files 318 and the respective log file chunk 602A being transmitted to the first node 200.

If the first log sequence indicator LSNi corresponds to a start-of-term log record, then the metadata in the file name 606A may additionally include a previous term indicator 810, indicating the data term of the previous log file chunk. This allows log file chunks 602A, 602B representing log records 320A to 320D from different terms to be easily reconstructed, and also allows a log file chunk 602A comprising a start-of-term log record to be easily identified.

A start-of-term log sequence indicator 812 may also be included in the metadata, wherein the start-of-term log sequence indicator for a given log file chunk 602B represents the first log sequence indicator LSNi of the first log file chunk 602A having the same upload term indicator 806 as the given log file chunk 602B. Providing this information in the log file chunks 602A, 602B allows a determination of where the process of uploading data to the first node 200 was at the start of a term, which may be helpful for debugging purposes.

In some examples, the data in the database implemented by the second node 300 may be deleted. To this end, the method 500 may involve configuring the second node 300 to apply a selection algorithm to identify data to be deleted from the database and to delete the identified data.

Providing a master storage node 200 on which all of the data of the database is backed up allows data of the database to be removed from the second node 300 whilst ensuring that this data is still available for further nodes and/or for the second node 300 at a later time. Removing the data from the second node 300 means that, while the size of the database may increase, the storage capacity of the second node 300 may be kept the same or at least not increased to the same extent.

Figure 9:
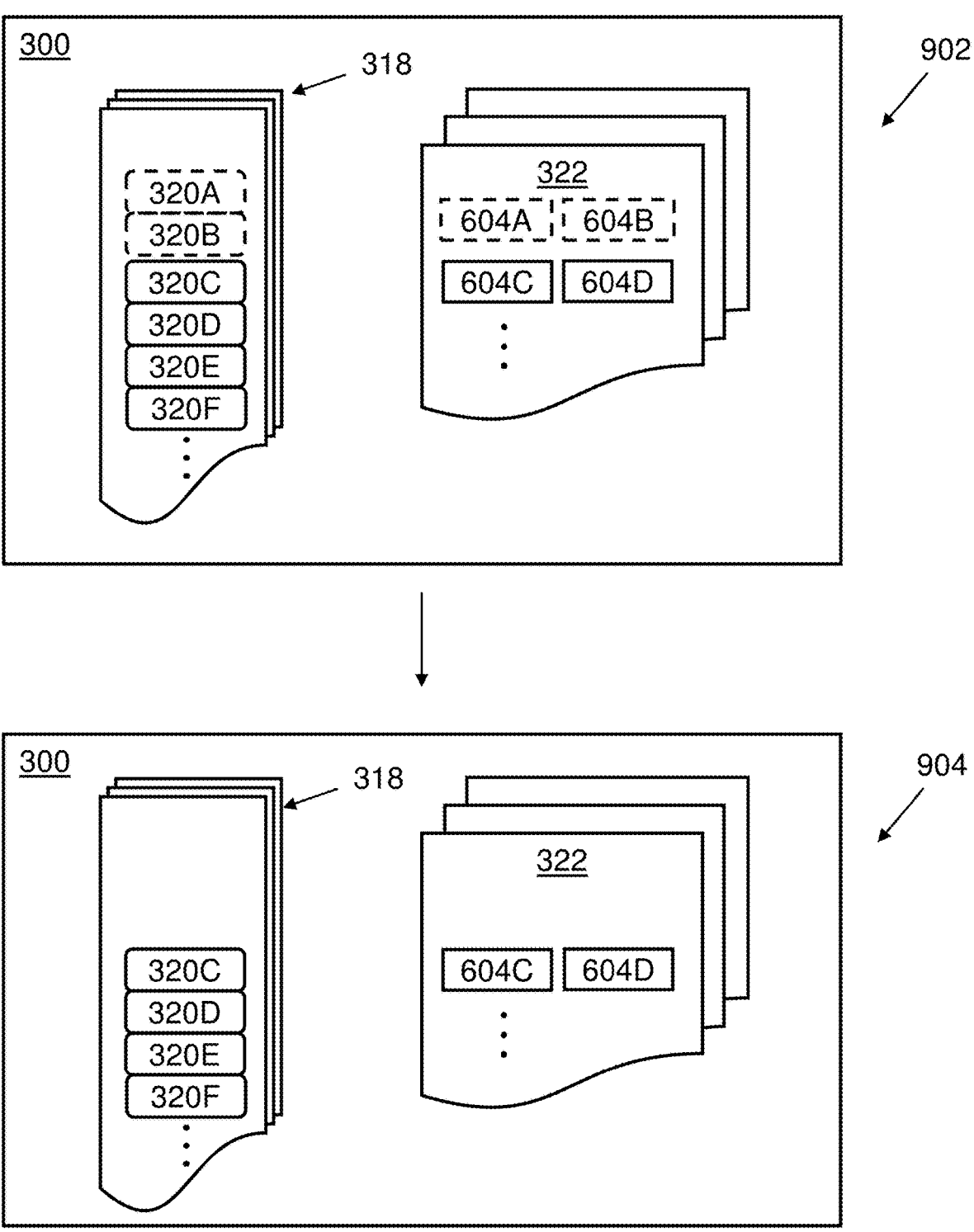
FIG. 9 is a schematic diagram showing a process for deleting data in the database according to examples.
Figure 10:
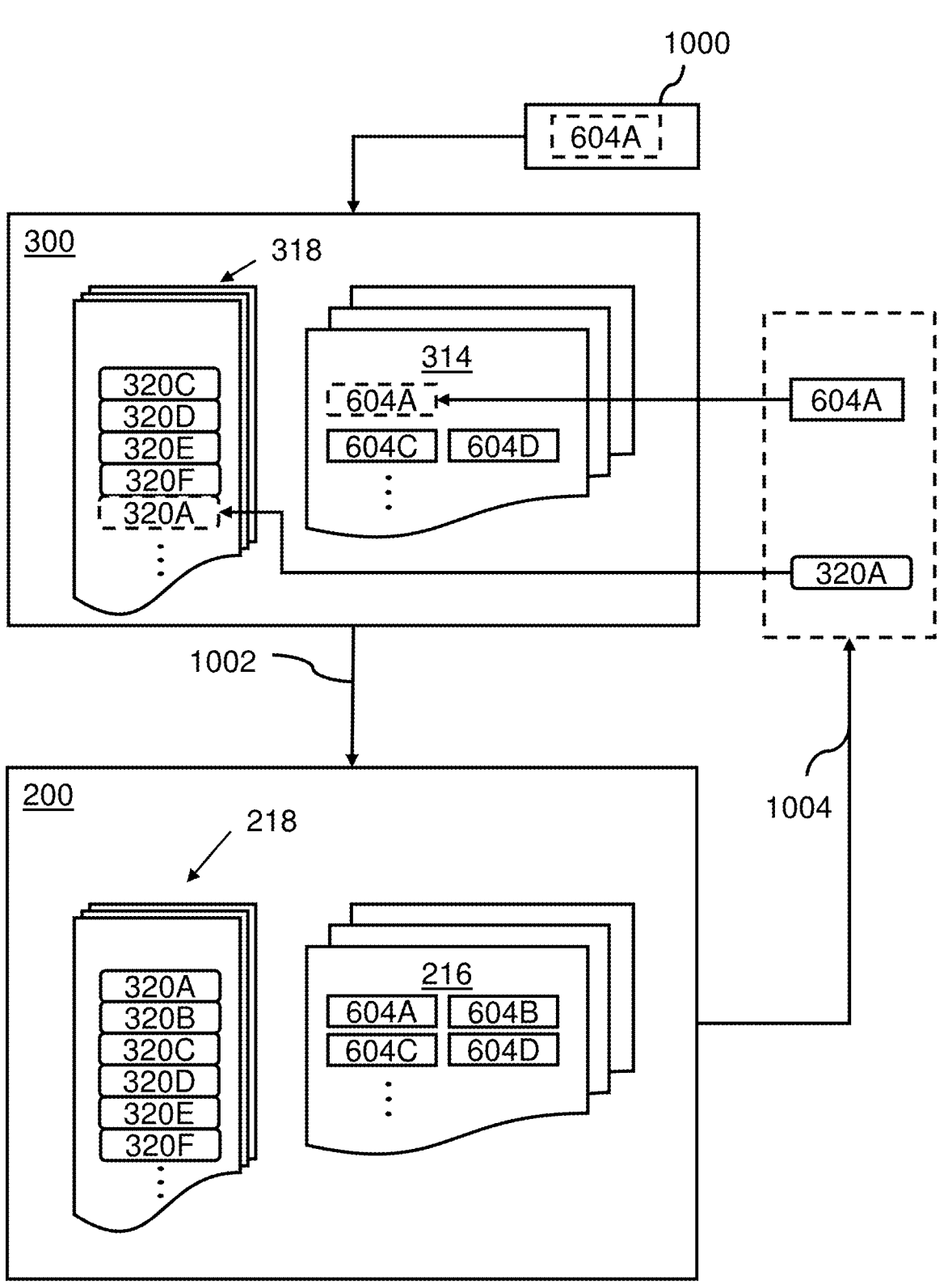
FIG. 10 is a schematic diagram showing a process for downloading data, implemented by the node shown in FIG. 3, according to examples.

FIG. 9 shows an example in which the second node 300 is configured to apply a selection algorithm to identify data 604A and 604B which can be deleted from the database. The second node 300 is shown at a first time 902, before the data 604A and 604B has been selected, and at a second time 904 after the data 604A and 604B has been selected and deleted. The selection algorithm may identify data 604A and 604B which can be deleted from the database without disrupting the operations being performed by a user. For example, the selection algorithm may identify data 604A and 604B which has not recently been accessed or is unlikely to be accessed in the near future.

Before deleting any selected data 604A and 604B the second node 300 may confirm that the selected data 604A and 604B has been transmitted to the first node 200. In examples where a checkpoint log record 320F is generated, confirming that the selected data 604A, 604B has been transmitted to the first node 200 may involve checking for a respective checkpoint log record 320F. Alternatively, or additionally, the selection algorithm may be limited to select only data 604A, 604B which has a corresponding log record 320A, 320B which has been transmitted to the first node 200 in a log file chunk. After the data 604A and 604B has been deleted from the database, the associated log file records 320A and 320B may also be deleted.

As briefly discussed above, and described in co-pending U.S. application Ser. No. 16/382,017, the transaction log, maintained in the log files 318, may be periodically truncated to remove older log records which are no longer needed. This is done to make space on the second node 300 and allow new transactions to be recorded. By transmitting the log file chunks 602A, 602B to the first node 200 it is possible to store a log history of the database which includes log records predating the log records maintained on the second node 300. By maintaining historical log records, the first node 200 is able to support point-in-time restore for the second node 300 and any further nodes which are provisioned later. Point-in-time restore is a restore process in which the database can be restored to a specific point in time using an historic snapshot and older log records representing the desired point in time.

In some examples, the selection algorithm uses a least recently used algorithm, or LRU. Least recently used algorithms are a class of algorithms which identify data which has been least recently used and discard this data to make space for newer data. The selection algorithm may alternatively use a combination of a least recently used algorithm, configured to identify the least recently used data in the database, and one or more further algorithms configured to narrow the selection of data to specific data in the database. For example, the selection algorithm may determine a reduced set of data in the database from which data can be selected for deletion. This may involve omitting any data which has not been transmitted to the first node 200 and/or omitting any data which is likely to be used in the near future before applying the least recently used algorithm. Data which is likely to be used in the near future may be identified from a workload which is in operation on the second node

300. For example, a specific workload may be configured to operate on a subset of the data in the database, and while some of this data may not have been recently used, it may be likely that it will be used in the near future by this workload. Additionally, or alternatively, the selection algorithm may also use a least frequently used algorithm, or LFU.

After data has been deleted from the database, the second node 300 may need to obtain the deleted data in order to perform one or more operations on that data. In the example shown in FIG. 10, the second node 300 obtains or otherwise receives an instruction 1000 to perform an operation on a portion of data 604A of the database which has been deleted. This instruction 1000 may be received as an instruction from a user or may be obtained automatically as part of a workload that is in operation on the second node 300. The instruction 1000 may include an indication of the portion of data 604A which is to be operated on. This indication may be in the form of a file name of the portion of data 604A or may refer to a respective log sequence indicator of a log record 320A associated with the portion of data 604A.

In response to the instruction 1000, the second node 300 may submit a request 1002 to the first node 200 to retrieve the portion of data 604A. The first node 200 may respond 1004 to the request 1002 providing the portion of data 604A. The first node 200 may update the set of log files 318 with a log record 320A indicating that the portion of data 604A has been retrieved by the second node 300. Once the portion of data 604A has been downloaded from the first node 200, the second node 300 may be configured to perform an operation on the portion of data 604A according to the instruction 1000. In this way, data 604A can be deleted from the second node 300 so that the storage capacity does not need to be increased, and that data 604A can be quickly provisioned on demand from the first node 200 if it is needed later.

Figure 11:
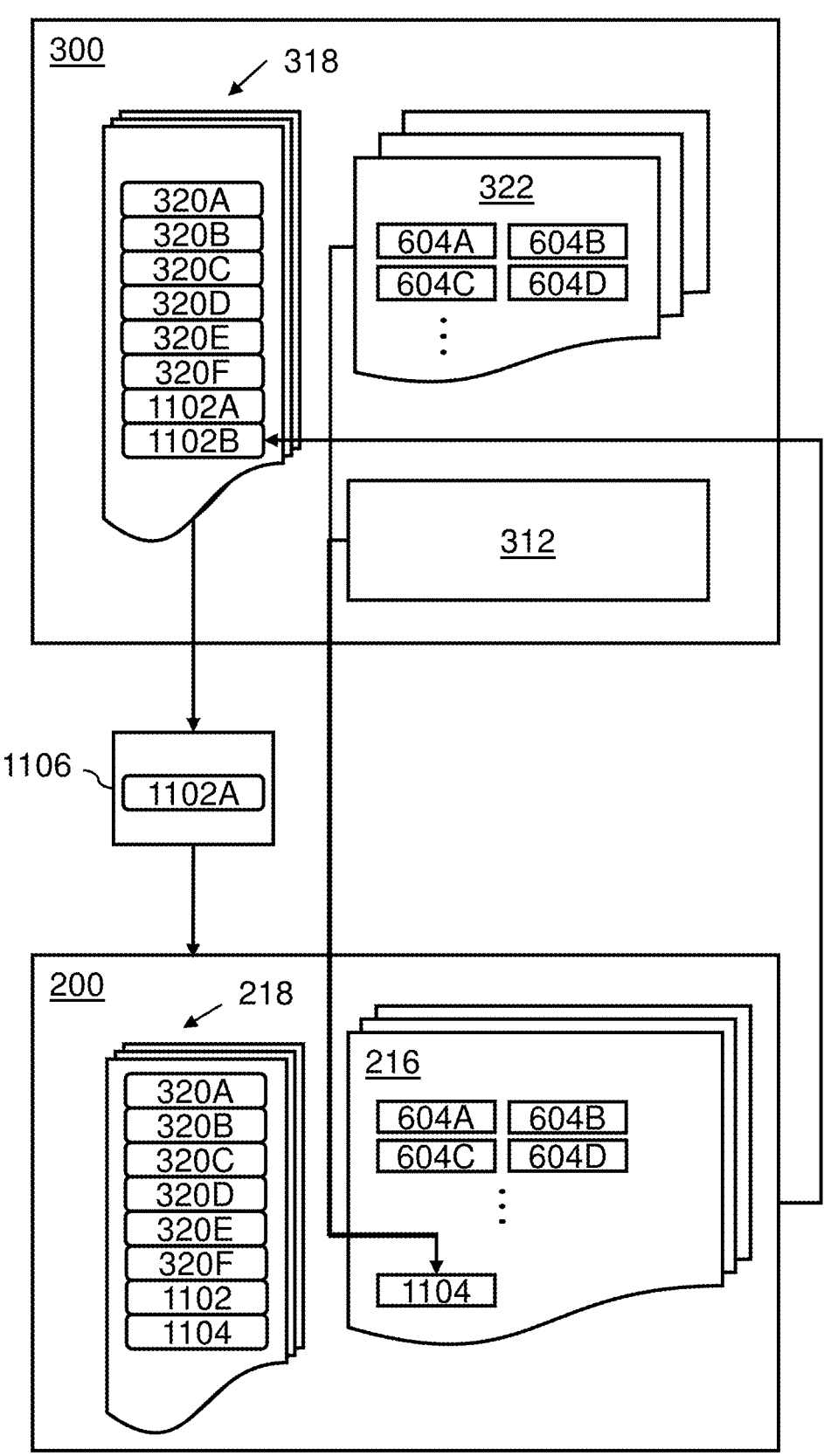
FIG. 11 is a schematic diagram showing a snapshot backup process according to examples.

Snapshots 324, representing an in-memory state of the database at a given time, may be periodically generated by the second node 300. In some examples described herein, one or more of the snapshots 324 may be created by directly transmitting the associated data to the first node 200. In these examples, the process of creating a snapshot may be considered to be completed when the snapshot data is transmitted to the first node 200. FIG. 11 shows an example that involves configuring the second node 300 to perform a snapshot backup process, which comprises writing a snapshot log record 1102A in the log files 318, generating a snapshot 1104 of the data in the second database, and transmitting a log file chunk 1106 comprising the snapshot log record 1102A to the first node 200. In this example the log files 318 include a checkpoint log record 1102B corresponding to the same log file chunk 1106 which comprises the snapshot log record 1102A. The snapshot backup process may be considered complete when the log files 318 include a checkpoint log record 1102B indicating that the snapshot log record 1102A has been transmitted to the first node 200. In this way, it is ensured that the snapshot data 1104 has been transmitted to the first node 200 before the snapshot backup process is completed.

In some examples a snapshot log record 1102A may be written into the log files 318 before the snapshot process has been fully completed. This enables the snapshot log record 1102A to be transmitted to the first node 200 in a log file chunk 1106 and thereby cause the snapshot data 1104 to also be transmitted to the first node 200.

Generating the snapshot 1104 of the data in the database may comprise sending the data representing the in-memory state of the database, such as row store data 312, on the second node 300 to the first node 200. Generating the snapshot 1104 may additionally, or alternatively, involve sending other data from the data files 322 to the first node 200. In this example, the snapshot data 1104 may not exist on the second node 300. Generating the snapshot may comprise transmitting the data to be included in the snapshot data 1104 directly to the first node 200 without first generating the snapshot on the second node 300.

Figure 12:
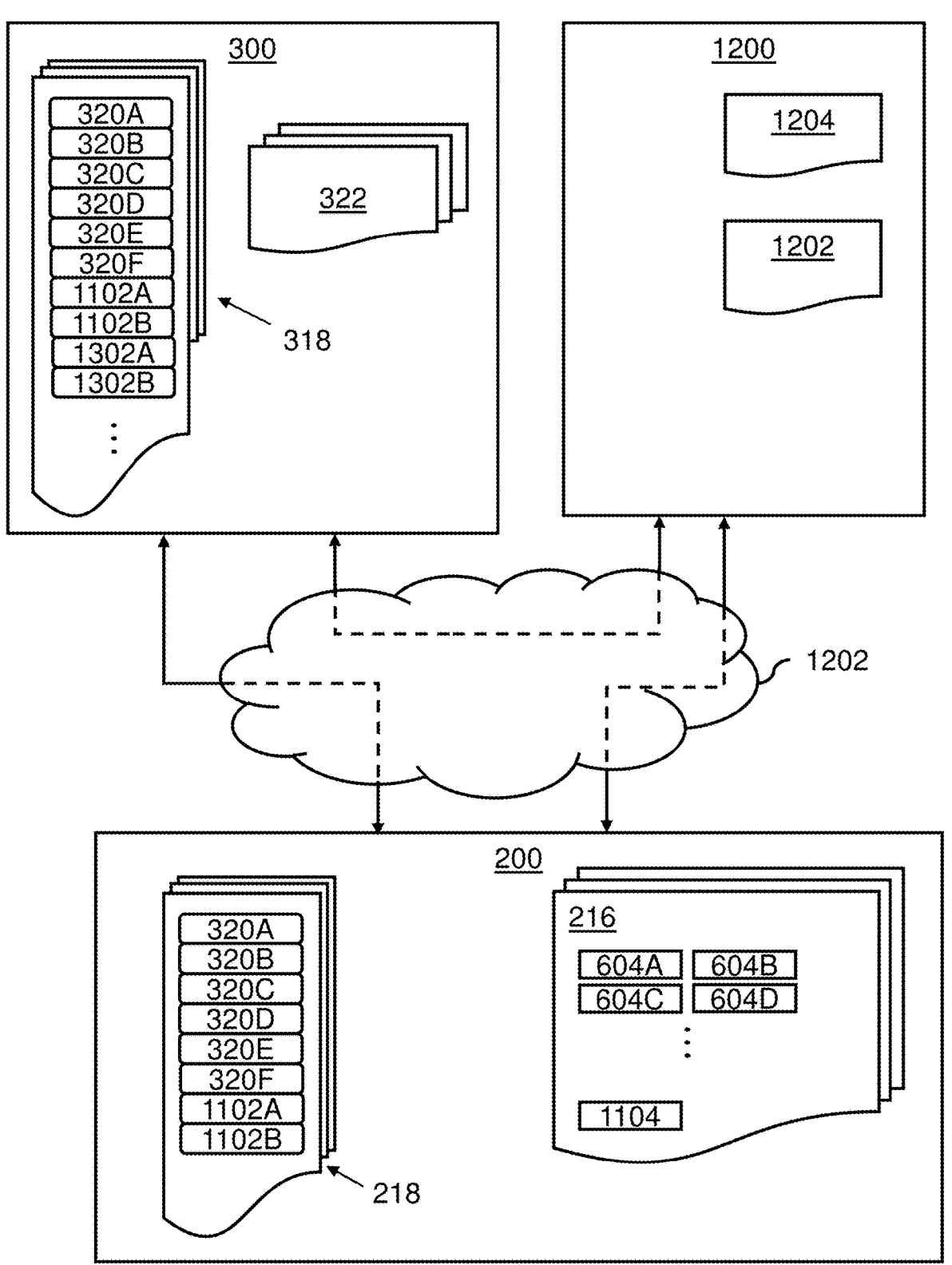
FIG. 12 is a schematic diagram showing a database management system comprising a master storage node, the node illustrated in FIG. 3, and at least one further node according to examples.
Figure 13:
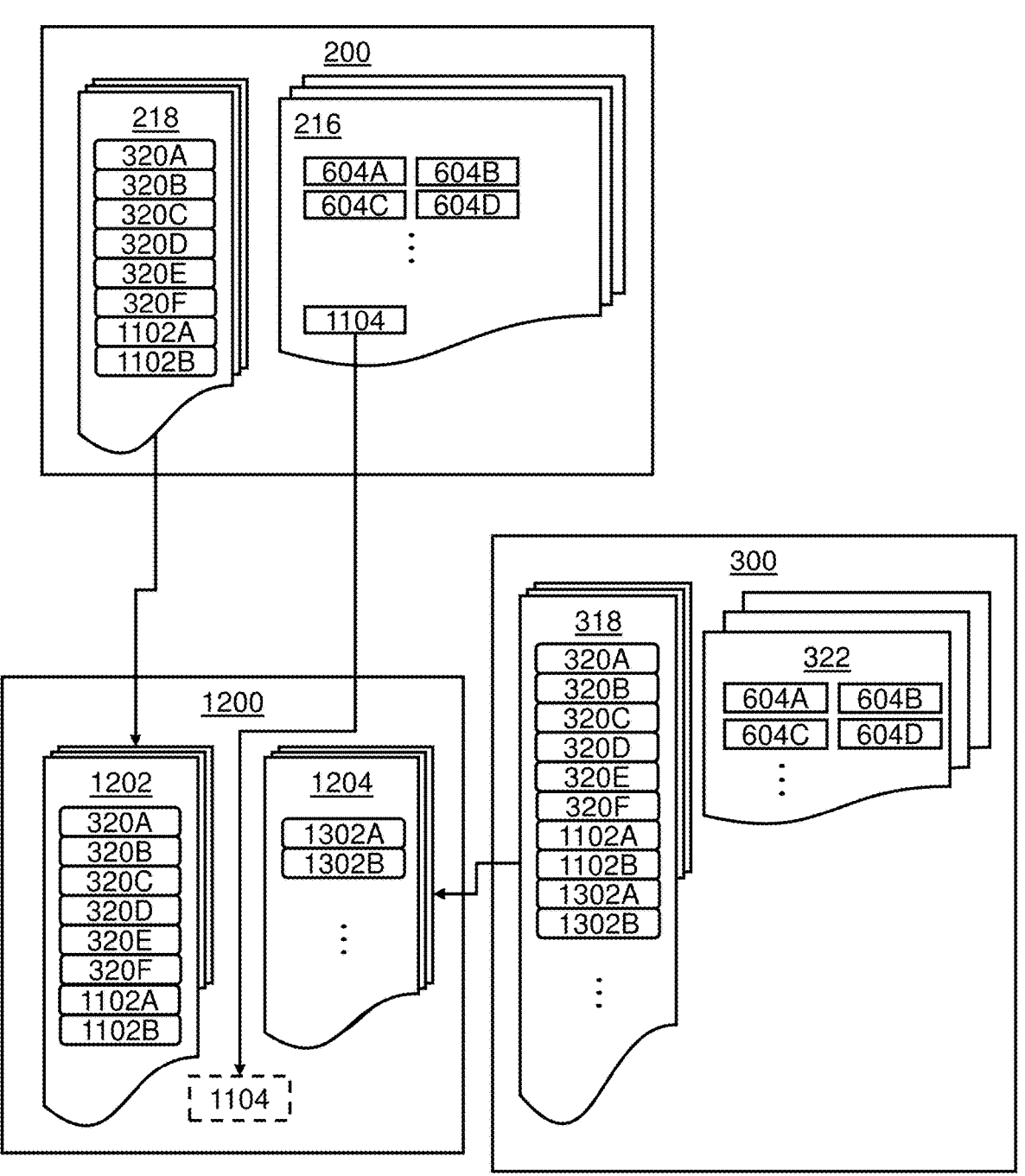
FIG. 13 is a schematic diagram showing a process for provisioning the further node according to examples.

As briefly described above in relation to FIGS. 2 to 4B further nodes can be provisioned in the database management system 600 to provide resources for users to run their own workloads on the data of the database. FIGS. 12 and 13 show an example of the method 500, in which the method 500 comprises provisioning a third node 1200, the third node 1200 performing operations on data stored in the database. The second node 300 and the third node 1200 may be communicatively coupled to the first node 200, and each other, over a network 1202, such as the internet.

In one example, provisioning the third node 1200 may involve identifying first log records that are older than, or equal to, a most recent checkpoint log record 1102B generated at the second node 300, and second log records that are more recent than the most recent checkpoint log record generated at the second node 300. These older and later log files can then be used to drive the provisioning process. For example, referring to FIG. 12, the older 1202 log files and the more recent 1204 log files may be downloaded to third node 1200, as shown, and using the log files to control replication of data stored in the first node 200 and second node 300 at the third node 1200. In this example the second log files 1204 comprise log records 1302A, 1302B that are more recent than the most recent checkpoint log record 1102B generated at the second node 300. The set of log files 318 on the second node 300 comprise two log records 1302A, 1302B which are more recent than the checkpoint log record 1104 and hence have not yet been transmitted to the first node 200. To replicate at least part of the data stored in the first 200 and second nodes 300, the third node 1200 may download a snapshot 1104 from the first node 200 and perform operations corresponding to log records 1302A, 1302B which are more recent than a snapshot log record 1102A corresponding to the downloaded snapshot 1104.

It may be possible to provision the third node 1200 with a specific subset of the data of the database. For example, referring to FIG. 13, the third node 1200 may be provisioned in order to run a specific workload which only requires a subset of the data stored in the database. In this case, the third node 1200 may download log records 320A to 320F, 1102A, 1102B, 1302A, 1302B up to a specific point in time, or between two specific snapshots stored on the first node 200. In this way, the third node 1200 may be provisioned with specific data or replicated to a specific point in time, also referred to as point-in-time restore.

When replicating at least part of the data stored in the first 200 and second 300 nodes, the third node 1200 may not initially be provided with all of the data files 604A to 604D, such as binary large objects. For example, some data 604A to 604D may only be downloaded when it is needed, in a manner similar to that described above in relation to FIG. 10. By waiting to download the specific data 604A and 604D at the third node 1200 until it is needed, the third node 1200 can initially be provisioned much faster allowing operations to begin on the third node 1200 earlier. It will be appreciated that running a workload on data 604A and 604D may initially be slower when data 604A and 604D are downloaded from the first 200 and second 300 node on request.

Generally, each binary large object 326 has a corresponding blob creation log record in the set of log files 318. When replaying the log records 1202 and 1204 downloaded to the third node 1200, the third node 1200 may process a blob creation log record by reserving a binary large object page (i.e. substantially fixed-length contiguous block of memory, or virtual memory) without requiring the corresponding binary large object 326 to be downloaded to the third node 1200. In this way, the third node 1200 is able to quickly and efficiently replay the log records 1202 and 1204 in order to obtain a contemporary state of the data in the database, without having to download the actual binary large objects 326. Since, as explained above, Binary large objects 326 are often large unstructured data files which can take considerable bandwidth to download, downloading the binary large objects 326 as and when they are needed provides an increase in the efficiency of the third node 1200, and the first node 200.

On receipt of an instruction to perform an operation on a binary large object 326, the third node 1200 may be configured to identify whether the binary large object 326 is stored in the third node 1200. If the binary large object 326 is not stored in the third node 1200, the third node 1200 may download the binary large object 326 from either the first node 200 or the second node 300. As described above in relation to FIG. 3, the second node 300 may be implemented as a cluster of computing resources and as such can provide high availability and durability of the data in absence of the first node 200. Where a binary large object is not stored on the first node 200, for example, if it has not yet been transmitted to the first node 200, the second node 300 may be able to provide the binary large object directly to the third node 1200.

The third node 1200 may implement a similar deletion process as the second node 300 described with respect to FIG. 9. By providing complimentary deletion and downloading processes for blobs 326, and other data files 322, which aren't being frequently used, the second 300 and third 1200 nodes can be provided with fewer computing resources while still being able to perform complex workloads at the instruction of users. This in turn increases the efficiency and availability of the database for users.

FIG. 14 shows a non-transitory computer-readable storage medium 1400 comprising a set of computer-executable instructions 1402 to 1408. When the instructions 1402 and 1408 are executed by one or more processor(s) 1410, they cause the processor 1410 to configure 1402 the second node 300 to perform a set of steps 1404 to 1408. The steps 1404 to 1408 include writing data indicative of one or more operations that have been performed on data in the database to a set of log files 318. An operation is made permanent in the database once the set of log files 318 have been updated to include data indicative of the operation and without requiring the data associated with the operation to be transmitted to the first node 200. The steps 1404 to 1408 also include segmenting the set of log files 318 into a set of log file chunks 602A, 602B, wherein each log file chunk 602A, 602B is a portion of a log file in the set of log files 318. At a last step 1408, for a given log file chunk 602A, data 602A, 602 from the database corresponding to the log file chunk 602A is transmitted to the first node 200, and thereafter the log file chunk 602A is transmitted to the first node 200. Further specific examples described above in relation to the method 500 may also apply to the instructions 1402 to 1408 shown in FIG. 14.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A method for managing data in a database management system, the database management system comprising a first node, the first node being a master storage node for storing user data from a database, and a second node, the second node performing operations on user data stored in the database, wherein the operations include reading or writing the user data, wherein the method comprises configuring the second node to:

write log data indicative of one or more operations that have been performed on user data in the database to a set of log files, the set of log files being used to record operations performed on user data in the database and being stored in non-volatile storage of the second node, wherein the one or more operations are made permanent in the database once the log data is written to the set of log files in the non-volatile storage of the second node;

segment the set of log files into a set of log file chunks, wherein each log file chunk is a portion of a log file in the set of log files; and for a said log file chunk, transmit user data, corresponding to log data in the said log file chunk and comprising a binary large object, to the first node and thereafter transmit the said log file chunk to the first node, wherein the second node segments the set of log files and transmits the log file chunks and corresponding user data to the first node asynchronously to its writing of log data to the set of log files.

2. The method according to claim 1, wherein each log file of the set of log files comprises a set of log records, each log record representing a single operation and being associated with a log sequence indicator representing a relative order of the single operation with respect to other operations.

3. The method according to claim 2, comprising configuring the first node to:

receive log file chunks from the second node; and reconstruct the set of log files from the log file chunks.

4. The method according to claim 3, wherein respective file names for each log file chunk comprise metadata including:

a first log sequence indicator that is a log sequence indicator representing an oldest log record in the log file chunk; and a second log sequence indicator that is a log sequence indicator representing a newest log record in the log file chunk, wherein the first node identifies adjacent log file chunks based at least on the respective first log sequence indicators and the respective second log sequence indicators for each log file chunk, whereby to reconstruct the set of log files from the log file chunks.

5. The method according to claim 2, comprising configuring the second node to write a checkpoint log record to the log files confirming that all log records up to and including the log records in the transmitted log file chunk have been transmitted to the first node.

6. The method according to claim 5, wherein, on receipt of the log file chunk, the first node provides a signal to the second node confirming receipt of the log file chunk, and wherein updating the log files at the second node to include the checkpoint log record is dependent on the second node receiving the signal confirming receipt of the log file chunk.

7. The method according to claim 5, comprising configuring the second node to perform a snapshot backup process, the snapshot backup process comprising:

writing a snapshot log record in the log files;

generating a snapshot of the user data in the database; and ending the snapshot backup process after a log file chunk comprising the snapshot log record is transmitted to the first node and the set of log files include a checkpoint log record corresponding to the log file chunk comprising the snapshot log record.

8. The method according to claim 5, further comprising provisioning a third node, the third node performing operations on user data stored in a database, wherein provisioning the third node includes:

downloading first log files from the first node, the first log files comprising log records that are older than a most recent checkpoint log record generated at the second node;

downloading second log files from the second node, the second log files comprising log records that are more recent than the most recent checkpoint log record generated at the second node; and replicating at least part of the user data stored in the first and second nodes at the third node using the downloaded first and second log files.

9. The method according to claim 8, wherein the first log files comprise log records that are:

older than a first specified log record;

more recent than the first specified log record; or older than the first specified log record and more recent than a second specified log record.

10. The method according to claim 8, wherein the second log files comprise log records that are:

older than a first specified log record;

more recent than the first specified log record; or older than the first specified log record and more recent than a second specified log record.

11. The method according to claim 8, wherein the first log files comprise log records that are more recent than a first specified snapshot log record and less recent than a second specified snapshot.

12. The method according to claim 8, wherein replicating at least part of the user data is dependent on receiving an instruction to perform an operation on the at least part of the user data at the third node.

13. The method according to claim 8, wherein the third node downloads a snapshot from the first node and performs operations corresponding to log records which are more recent than a snapshot log record corresponding to the downloaded snapshot, whereby to replicate at least part of the user data stored in the first and second nodes.

14. The method according to claim 8, wherein each binary large object corresponds to a respective blob creation log record in the set of log files, and the third node processes a blob creation log record by reserving a binary large object page without requiring the corresponding binary large object to be downloaded to the third node.

15. The method according to claim 8, comprising configuring the third node to:

on receipt of an instruction to perform an operation on a binary large object, identify whether the binary large object is stored in the third node; and if the binary large object is not stored in the third node, download the binary large object from either the first or second node.

16. The method according to claim 1, comprising configuring the second node to:

apply a selection algorithm to identify user data to be deleted from the database; and delete the identified user data, wherein user data in the database which is identified for deletion has been transmitted to the first node.

17. The method according to claim 16, comprising configuring the second node to:

obtain an instruction to perform an operation on a portion of user data of the database which has been deleted;

in response to the instruction, download the portion of user data from the first node; and perform the operation on the portion of user data according to the instruction.

18. A database management system comprising:

a first node, the first node comprising at least one processor and storage comprising first computer-executable instructions which, when executed by the at least one processor, cause the first node to implement a master storage node for storing user data from a database; and a second node, the second node performing operations on user data stored in the database, the operations comprising reading or writing the user data, wherein the second node comprises at least one processor and storage comprising second computer-executable instructions which, when executed by the least one processor of the second node, cause the second node to:

write log data indicative of one or more operations that have been performed on user data in the database to a set of log files, the set of log files being used to record operations performed on user data in the database and being stored in the storage of the second node, wherein the one or more operations are made permanent in the database once the log data is written to the set of log files;

segment the set of log files into a set of log file chunks, wherein each log file chunk is a portion of a log file in the set of log files; and for a said log file chunk, transmit user data, corresponding to log data in the said log file chunk and comprising a binary large object, from the second node to the first node and thereafter transmit the log file chunk to the first node, wherein the second node segments the set of log files and transmits the log file chunks and corresponding user data to the first node asynchronously to its writing of log data to the set of log files.

19. The database management system according to claim 18, wherein each log file of the set of log files comprises a set of log records, each log record representing a single operation and being associated with a log sequence indicator representing a relative order of the single operation with respect to other operations.

20. A non-transitory computer-readable storage medium comprising computer executable instructions which, when executed by at least one processor, cause the at least one processor to:

implement a first node, the first node being a master storage node for storing user data from a database;

implement a second node for performing operations on data stored in the database, the operations comprising reading or writing the user data, the second node being configured to:

write log data indicative of one or more operations that have been performed on user data in the database to a set of log files, the set of log files being used to record operations performed on user data in the database and being stored in the storage of the second node, wherein the one or more operations are made permanent in the database once the log data is written to the set of log files;

segment the set of log files into a set of log file chunks, wherein each log file chunk is a portion of a log file in the set of log files; and for a said log file chunk, transmit user data, corresponding to log data in the said log file chunk and comprising a binary large object, from the second node to the first node and thereafter transmit the log file chunk to the first node, wherein the second node segments the set of log files and transmits the log file chunks and corresponding user data to the first node asynchronously to its writing of log data to the set of log files.

* * * * *